United States Patent
Splain et al.

(10) Patent No.: US 7,398,976 B2
(45) Date of Patent: Jul. 15, 2008

(54) SHOPPING CART BASKET

(75) Inventors: William D. Splain, Brooklyn Park, MN (US); Robert D. Peota, Minneapolis, MN (US); Alexandre Hennen, Cambridge, MA (US); Allan Cameron, Natick, MA (US); Mark T. Ryan, Haskell, OK (US); David L. Pruitt, Jr., Brookland, AR (US)

(73) Assignee: Target Brands, Inc., Minneapolis, MN (US)

( * ) Notice: Subject to any disclaimer, the term of this patent is extended or adjusted under 35 U.S.C. 154(b) by 25 days.

(21) Appl. No.: 11/231,364

(22) Filed: Sep. 19, 2005

(65) Prior Publication Data

US 2007/0063465 A1     Mar. 22, 2007

(51) Int. Cl.
*B62D 39/00*     (2006.01)

(52) U.S. Cl. .............................. 280/33.992; 280/33.991; 280/33.997

(58) Field of Classification Search ............ 280/33.992, 280/33.991, 33.997, 33.993, 47.35, 659
See application file for complete search history.

(56) References Cited

U.S. PATENT DOCUMENTS

| | | | |
|---|---|---|---|
| 2,479,530 A | 8/1949 | Watson | |
| D155,971 S | 11/1949 | Concklin | |
| D156,701 S | 1/1950 | Concklin | |
| D156,702 S | 1/1950 | Concklin | |
| D157,589 S | 3/1950 | Hartenbach | |
| 2,527,953 A | 10/1950 | Muffley | |
| 2,906,542 A | 9/1959 | Hoedinghaus et al. | |
| D188,841 S | 9/1960 | Umanoff | |
| 2,958,536 A | 11/1960 | Young | |
| 2,997,311 A | 8/1961 | Umanoff | |
| 3,048,420 A | 8/1962 | Umanoff | |

(Continued)

FOREIGN PATENT DOCUMENTS

EP     0 161 108     3/1985

(Continued)

OTHER PUBLICATIONS

Plastic shopping cart web page, IPT, Inc., available at http://www.inplastech.com/Products_EX11575WM_LG.asp; printed out Jan. 24, 2006. (2 pages).

(Continued)

*Primary Examiner*—Hau Phan
(74) *Attorney, Agent, or Firm*—Faegre & Benson LLP

(57) ABSTRACT

A basket for a shopping cart comprising a single unitary member molded from a plastic material. The basket includes a frame including a plurality of generally vertical upright frame members spaced apart from each other, with each frame member including a generally smooth outer surface without holes. A front panel extends generally vertically and laterally across the front portion of the single unitary member between two of the generally vertical upright frame members. A pair of side panels extends generally vertically, being generally parallel to each other and spaced from each other. Each side panel extends from a front portion to a rear portion of the basket between two of the generally vertical upright frame members. The front panel and each side panel comprise a generally flat portion defining a plurality of holes and have a substantially uniform thickness at least about two times less than a thickness of the generally vertical upright frame members.

26 Claims, 11 Drawing Sheets

U.S. PATENT DOCUMENTS

| | | | |
|---|---|---|---|
| 3,112,934 | A | 12/1963 | Buczak |
| D198,448 | S | 6/1964 | Moran |
| 3,195,912 | A | 7/1965 | Howard et al. |
| 3,346,271 | A | 10/1967 | Parsons |
| 3,614,133 | A | 10/1971 | Ganci et al. |
| 3,645,554 | A | 2/1972 | Van Stein et al. |
| 3,717,358 | A | 2/1973 | Mills |
| D231,336 | S | 4/1974 | Wahl |
| 3,829,114 | A | 8/1974 | Cohen et al. |
| 3,931,984 | A | 1/1976 | Young |
| 3,999,774 | A | 12/1976 | Rehrig |
| 4,046,394 | A | 9/1977 | Thompson et al. |
| D247,953 | S | 5/1978 | Rehrig |
| 4,123,077 | A | 10/1978 | Joseph |
| 4,268,049 | A * | 5/1981 | Salvador ............... 280/33.996 |
| 4,273,346 | A | 6/1981 | Rehrig |
| 4,286,795 | A | 9/1981 | Rehrig |
| 4,376,502 | A | 3/1983 | Cohen |
| 4,423,882 | A | 1/1984 | Stover et al. |
| D277,532 | S | 2/1985 | Duhamel |
| 4,537,413 | A | 8/1985 | Rehrig |
| 4,555,123 | A | 11/1985 | Rehrig |
| D283,264 | S | 4/1986 | Levy-Joseph |
| 4,632,411 | A | 12/1986 | Badger |
| 4,650,199 | A * | 3/1987 | Rehrig ................. 280/33.997 |
| D294,419 | S | 2/1988 | Rehrig |
| 4,746,134 | A | 5/1988 | Rehrig |
| D296,259 | S | 6/1988 | Rehrig |
| 4,865,338 | A | 9/1989 | Rehrig |
| 4,922,639 | A | 5/1990 | Rehrig |
| 4,930,795 | A | 6/1990 | Tannehill et al. |
| D311,983 | S | 11/1990 | Rehrig |
| D314,269 | S | 1/1991 | Trubiano |
| D317,219 | S | 5/1991 | Rehrig |
| D326,550 | S | 5/1992 | Waterman |
| 5,111,604 | A | 5/1992 | Rehrig |
| 5,203,578 | A | 4/1993 | Davidson et al. |
| 5,210,968 | A | 5/1993 | Rehrig |
| 5,238,256 | A | 8/1993 | Ondrasik |
| 5,255,930 | A * | 10/1993 | Jones et al. ............ 280/33.992 |
| D343,711 | S | 1/1994 | Craft et al. |
| 5,289,936 | A | 3/1994 | Jones et al. |
| 5,331,756 | A * | 7/1994 | Rehrig ........................ 40/308 |
| 5,368,318 | A | 11/1994 | Rehrig et al. |
| D359,828 | S | 6/1995 | Lindberg |
| 5,441,288 | A * | 8/1995 | Rehrig ................. 280/33.991 |
| 5,458,347 | A | 10/1995 | Chiv |
| 5,553,877 | A | 9/1996 | Huang |
| D377,255 | S | 1/1997 | Rehrig |
| 5,595,394 | A | 1/1997 | Adamson |
| 5,613,696 | A | 3/1997 | de Luna |
| D379,834 | S | 6/1997 | Huang |
| 5,791,666 | A * | 8/1998 | Mainard ................ 280/33.991 |
| D400,679 | S | 11/1998 | Kern et al. |
| D401,067 | S | 11/1998 | Hampshire |
| 5,836,596 | A | 11/1998 | Wanzl |
| 5,865,448 | A | 2/1999 | Kern et al. |
| 5,871,286 | A | 2/1999 | Kern et al. |
| D411,264 | S | 6/1999 | Huang |
| 5,915,704 | A | 6/1999 | Segura de Luna |
| D412,046 | S | 7/1999 | Rehrig et al. |
| 5,947,313 | A * | 9/1999 | Kern et al. ............ 280/33.991 |
| 5,961,133 | A | 10/1999 | Perry |
| 6,029,380 | A | 2/2000 | Goddard |
| D421,336 | S | 3/2000 | Demore et al. |
| D426,365 | S | 6/2000 | Rehrig et al. |
| 6,098,998 | A | 8/2000 | Ondrasik |
| 6,155,580 | A | 12/2000 | Symons |
| 6,186,382 | B1 | 2/2001 | Bergin et al. |
| D443,968 | S | 6/2001 | Porter |
| D444,281 | S | 6/2001 | Gaze et al. |
| D445,230 | S | 7/2001 | Deal et al. |
| D445,231 | S | 7/2001 | Porter |
| 6,270,093 | B1 | 8/2001 | Johnson et al. |
| D463,647 | S | 9/2002 | Deal et al. |
| D466,301 | S | 12/2002 | Sofy |
| D468,880 | S | 1/2003 | Porter |
| D470,292 | S | 2/2003 | Johnson et al. |
| 6,540,240 | B2 | 4/2003 | Nadeau et al. |
| D474,603 | S | 5/2003 | Berenguer |
| 6,572,122 | B2 | 6/2003 | Johnson et al. |
| 6,589,458 | B2 | 7/2003 | De Cost |
| 6,669,212 | B2 | 12/2003 | Porter |
| 6,705,623 | B2 | 3/2004 | Nadeau et al. |
| 6,736,415 | B1 | 5/2004 | Lenihan |
| 6,749,204 | B2 | 6/2004 | Werner |
| 6,761,364 | B2 * | 7/2004 | Murar et al. ........... 280/33.991 |
| D497,253 | S | 10/2004 | Alves |
| 6,805,365 | B2 | 10/2004 | Lantz |
| 6,966,566 | B2 | 11/2005 | Duchene et al. |
| 6,981,708 | B1 * | 1/2006 | Tucker et al. .......... 280/33.992 |
| 6,983,944 | B2 * | 1/2006 | Bergia ................... 280/33.991 |
| 7,063,337 | B2 | 6/2006 | Russell et al. |
| D530,478 | S | 10/2006 | Splain et al. |
| D536,874 | S | 2/2007 | Splain et al. |
| D538,501 | S | 3/2007 | Walter |
| D540,998 | S | 4/2007 | Splain et al. |
| D546,021 | S | 7/2007 | Splain et al. |
| 7,237,782 | B2 * | 7/2007 | Tucker et al. .......... 280/33.991 |
| D550,423 | S | 9/2007 | Splain et al. |
| D556,413 | S | 11/2007 | Splain et al. |
| 2002/0135144 | A1 | 9/2002 | Murar et al. |
| 2003/0116933 | A1 | 6/2003 | Nadeau et al. |
| 2003/0151217 | A1 | 8/2003 | Trubiano |
| 2004/0046341 | A1 | 3/2004 | Wilkinson |
| 2004/0104549 | A1 | 6/2004 | Bergia |
| 2005/0189360 | A1 | 9/2005 | Loucks et al. |

FOREIGN PATENT DOCUMENTS

| | | |
|---|---|---|
| EP | 0 161 890 | 3/1985 |
| WO | WO 93/02903 | 2/1993 |
| WO | WO 93/11018 | 6/1993 |
| WO | WO 95/03201 | 2/1995 |
| WO | WO 96/04161 | 2/1996 |
| WO | WO 97/30880 | 8/1997 |

OTHER PUBLICATIONS

The Supercart Hyper Trolley web page, Supercart, available at http://www.supercart.com/supercart/page.asp?SectionID=2&PageID=3; printed out May 13, 2005. (1 page).

The Supercard Mid Size Supercart Trolley web page, Supercart, available at http://www.supercart.com/supercart/page.asp?SectionID=2&PageID=4; printed out May 13, 2005. (1 page).

The Supercart Grocer Trolley web page, Supercart, available at http://www.supercart.com/supercart/page.asp?SectionID=2&PageID=5; printed out May 13, 2005. (1 page).

The Full Size all-plastic Supercart trolley web page, Supercart, available at http://www.supercart.com/supercart/page.asp?SectionID=2&PageID=6; printed out May 13, 2005. (2 pages).

Photo of Cart Icon from Greeley, Colorado, icon on public display 2nd Quarter 2004.

Photos (pp 2) of SuperCart Shopping Trolley at Euroshop Tradeshow in Dusselldorf, Germany in Feb. 19-23, 2005.

ARRK Prototype Brochure (pp 2) documenting Supercart Trolley display in Feb. 19-23, 2005.

Pending (IFW) U.S. Appl. No. 11/231,283, inventor Peota et al., filed on Sep. 19, 2005.

Pending (IFW) U.S. Appl. No. 11/231,307, inventor Splain et al., filed on Sep. 19, 2005.

Pending (IFW) U.S. Appl. No. 11/231,313, inventor Splain et al., filed on Sep. 19, 2005.

Pending (IFW) U.S. Appl. No. 11/231,343, inventor Splain et al., filed on Sep. 19, 2005.

Pending (IFW) U.S. Appl. No. 11/231,344, inventor Splain et al., filed on Sep. 19, 2005.

Pending (IFW) U.S. Appl. No. 29/238,739, inventor Splain et al., filed on Sep. 19, 2005.

Pending (IFW) U.S. Appl. No. 29/238,740, inventor Splain et al., filed on Sep. 19, 2005.

U.S. Appl. No. 11/595,037, filed Nov. 9, 2006, and entitled "Seat Assembly for a Shopping Cart".

U.S. Appl. No. 29/269,260, filed Nov. 27, 2006, and entitled "Handbasket".

U.S. Appl. No. 29/280,573, filed May 31, 2007, and entitled "Shopping Cart".

U.S. Appl. No. 29/296,975, filed Oct. 31, 2007, and entitled "Shopping Cart".

U.S. Appl. No. 29/264,725, filed Aug. 16, 2006, and entitled "Shopping Cart".

US 5,201,134, 04/1993, Rehrig et al. (withdrawn)

* cited by examiner

SHOPPING CART BASKET

BACKGROUND OF THE INVENTION

Shopping carts have become very important in Western culture. Stores around the world maintain fleets of shopping carts to facilitate a customer's selection, transport, and purchase of goods within those stores. Over many decades, the shape and size of shopping carts have changed to meet different models of shopping. However, in recent history, the basic shopping cart has changed very little, except for the application of different materials such as plastics.

Retailers devote considerable resources to shaping a customer's experience within a retail store to make shopping easier, more comfortable, and attractive. Unfortunately, very little of this attention has been placed on the shopping cart. Accordingly, shopping carts remain generally heavy, bulky, and difficult to maneuver. Conventional shopping carts are constructed to be rugged to withstand weather, misuse, and rough handling during use, collection and storage. Unfortunately, this attention to ruggedness has produced a cart with a steel chassis and handles, sometimes having rough edges and/or relatively sharp corners. These steel components contribute to the stodgy feel and unattractive appearance of many conventional shopping carts.

Given their high profile in the retail environment and their impact on the experience of the consumer, shopping carts should better serve to meet the needs and wants of consumers, especially in fast-moving, retail cultures.

SUMMARY OF THE INVENTION

Embodiments of the invention are directed to a basket for a shopping cart. The basket comprises a single unitary member molded from a plastic material and including a front portion, a rear portion, and a pair of side portions. The single unitary member includes a frame, a front panel, and a pair of side panels. The frame includes a plurality of generally vertical upright frame members spaced apart from each other. Each frame members includes a generally smooth outer surface without holes. The front panel extends generally vertically and laterally across the front portion of the single unitary member between two of the generally vertical upright frame members. The pair of side panels extends generally vertically and are generally parallel to each other and spaced from each other with each side panel extending from the front portion to the rear portion of the single unitary member between two of the generally vertical upright frame members. The front panel and each side panel comprise a generally flat portion defining a plurality of holes and have a substantially uniform thickness at least about two times less than a thickness of the generally vertical upright frame members.

BRIEF DESCRIPTION OF THE DRAWINGS

Embodiments of the invention will be described with respect to the figures, in which like reference numerals denote like elements, and in which.

DETAILED DESCRIPTION

Figure 1:
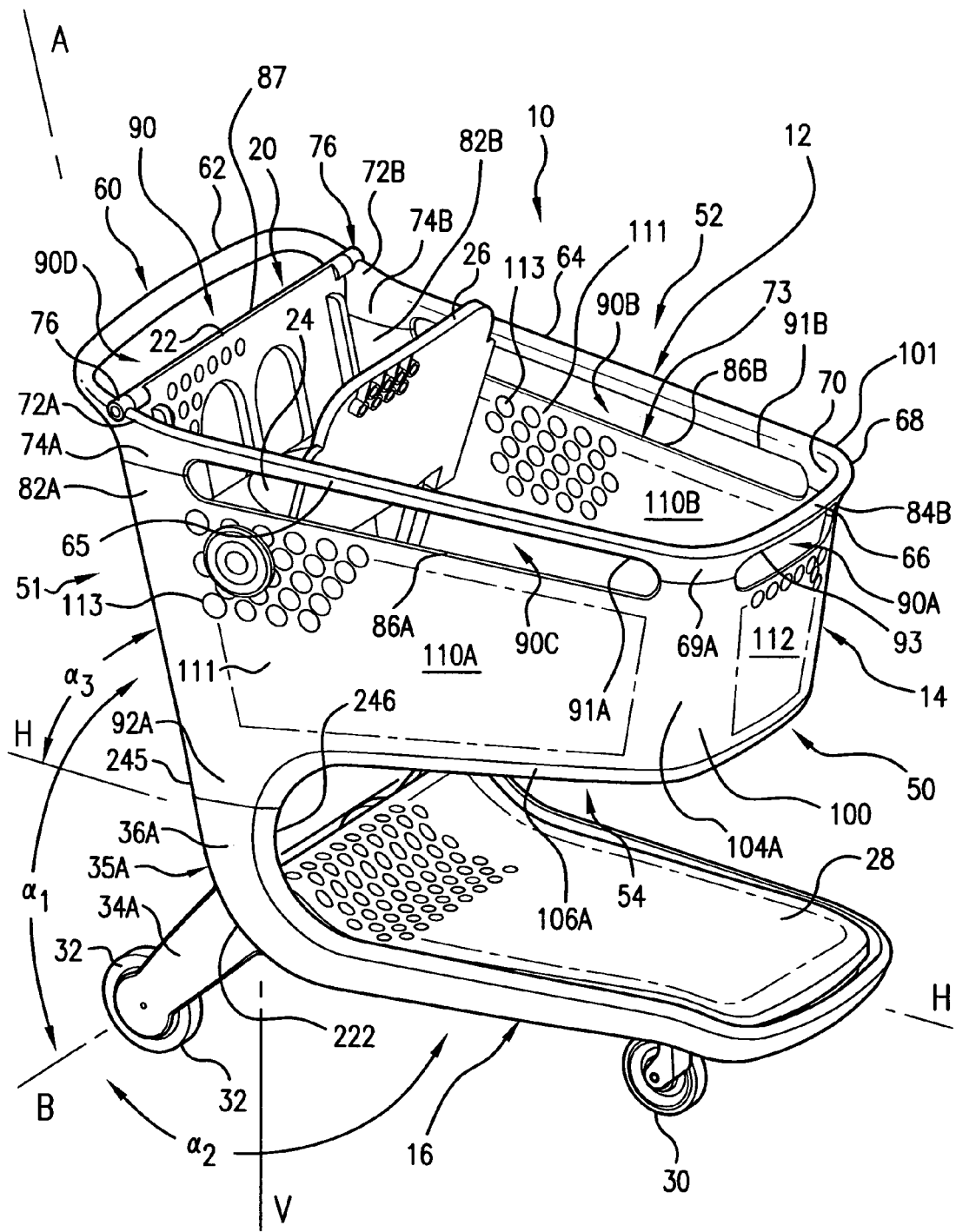
FIG. 1 is a perspective view of a shopping cart, according to an embodiment of the invention.

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Embodiments of the invention are directed to a shopping cart. The shopping cart enables a consumer to shop for items within a store, placing those items in the shopping cart as the consumer moves through the store. In one embodiment, a shopping cart comprises a wheeled base, a basket, and a handle. In one aspect, the handle forms a substantially continuous loop extending above an upper edge of the basket to enable steering the cart from the front, sides or rear of the cart. This ergonomic arrangement produces a panoramic grasping zone, in which the cart can be maneuvered from virtually any position within a 360 degree orientation about the cart. The panoramic handle enhances a consumer's ability to push, pull, or turn the cart while walking (or standing) at a front, side, or rear of the cart. Accordingly, this panoramic handle accommodates consumer preferences such as pulling a cart from the front while placing items in the cart as the consumer moves through racks and aisles in the store.

In another embodiment, a basket of the shopping cart comprises a container defined by a frame and a plurality of panels. The panels extend between portions of the frame and define the sides, front and bottom of the basket. The frame provides structural strength and stability to the basket. The panels contain items within the cart while providing a consumer-friendly, smooth surface on both the interior and exterior surfaces of the basket. In one aspect, the frame and the panels are molded together as a single unitary member so that members of the frame and the panels blend into each other in a generally integrated manner.

In one aspect, the handle acts as an upper member of the frame of the basket to provide structural strength and stability to the basket. In this aspect, the handle forms a substantially continuous loop having a size and shape that generally matches a size and shape of a mouth of the basket. In one embodiment, the handle is connected at portions of the mouth of the basket with a majority of the handle being spaced from the upper edge of the basket. In another aspect, the loop of the handle is shaped and sized to extend vertically in substantially the same plane as each of a front panel and a pair of opposed side panels of the basket.

In another embodiment, the basket is supported in a cantilevered arrangement by the wheeled base. In one aspect, a mast extends between the base and the basket to form the only vertical support for the basket with the base including a pair of base supports extending upward from the frame of the base. In this aspect, the shopping cart is free from any additional vertical supports (mounted between the base and the basket) located at a midportion or front portion of the cart.

These embodiments, and additional embodiments, are described in association with FIGS. 1-15.

Figure 2:
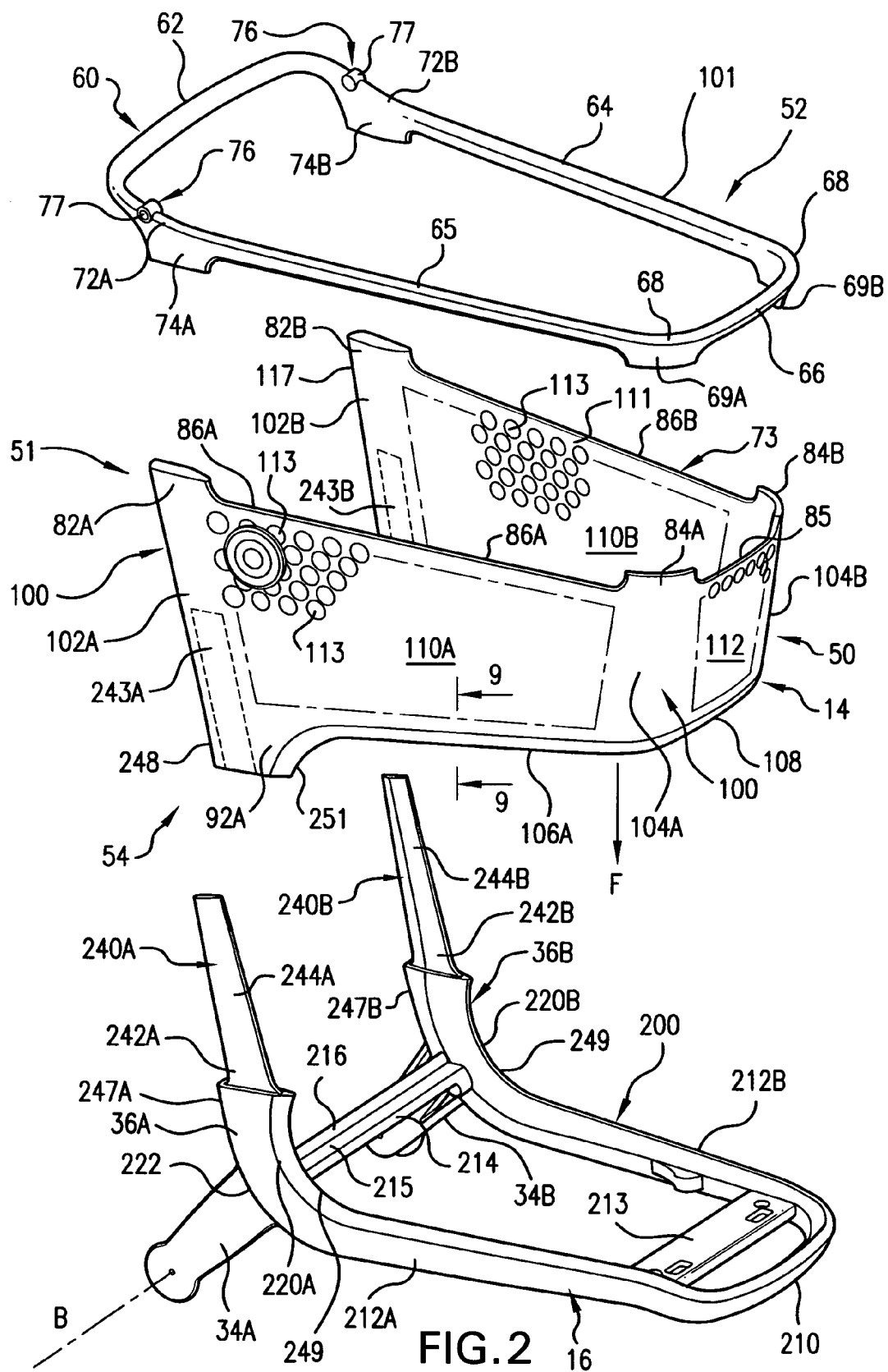
FIG. 2 is an exploded view of portions of the FIG. 1 shopping cart, according to an embodiment of the invention.
Figure 3:
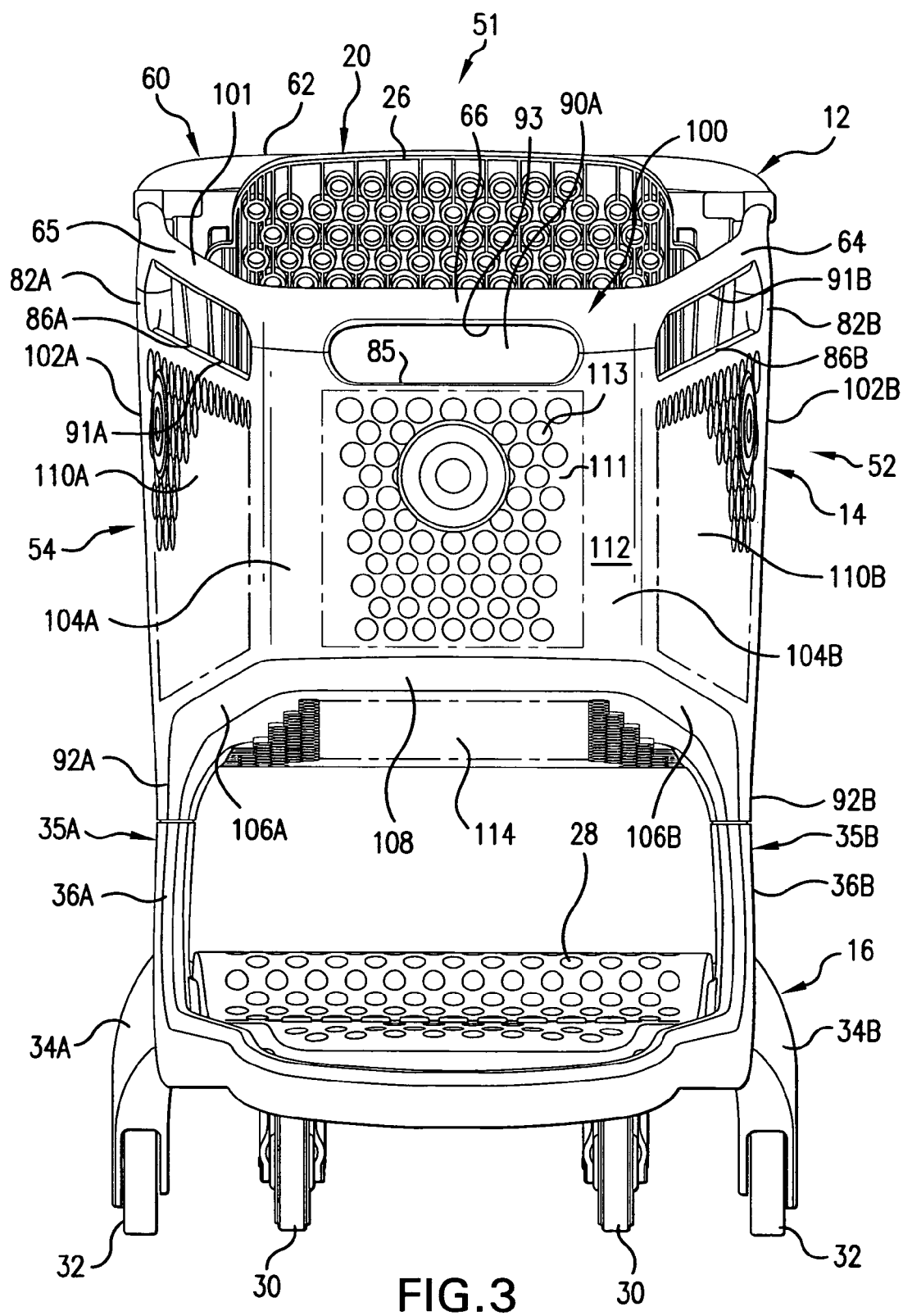
FIG. 3 is a front plan view of the FIG. 1 shopping cart, according to an embodiment of the invention.

FIGS. 1-3 illustrate a shopping cart 10, according to one embodiment of the invention. FIG. 1 is a perspective view of shopping cart 10, FIG. 2 is an exploded view of portions of shopping cart 10 of FIG. 1, and FIG. 3 is a front view of portions of shopping cart 10 of FIG. 1.

As shown in FIG. 1, shopping cart 10 comprises handle 12, basket 14, and wheeled base 16. Handle 12 is mounted at an upper portion of basket 14. Basket 14 defines a container for carrying items and supports a gate and seat assembly 20, which includes gate 22, seat 24, and backrest 26. Wheeled base 16 supports tray 28, front wheels 30, and rear wheels 32 via legs 34A,34B (also shown in FIG. 3). In one aspect, cart 10 comprises a front portion 50, rear portion 51, and side portions 52,54.

Shopping cart 10 enables a consumer to move the cart through a store to place items in basket 14 for later purchase at a check-out counter of the store. Handle 12 facilitates maneuvering the cart 10 while gate and seat assembly 20 enables a child to travel in the cart 10 while shopping. In one aspect, gate and seat assembly 20 is pivoted upward within basket 14 to enable nesting multiple carts 10 together. In another aspect, gate and seat assembly 20 is also collapsible adjacent a rear portion 51 of the basket to make more room for items in basket 14, or to facilitate nesting of multiple carts 10.

Base 16 is described in more detail in association with FIGS. 1-4. Basket 14 is described in more detail in association with FIGS. 1-9. Gate and seat assembly 20 is described in more detail in association with FIGS. 10-15B.

In one embodiment, each of handle 12, basket 14, and base 16 is made exclusively of a plastic material. This arrangement enables a lightweight cart while providing numerous structural, performance, and ergonomic functions. In another embodiment, one of handle, basket 14, or base 16, or additional components is made of a material other than a plastic material, such as metal or other materials.

In one embodiment, each of handle 12, basket 14, and base 16 is made from a nylon material. In another embodiment, each of handle 12, basket 14, and base 16 is made from a high density polyethylene (HDPE) material. In another embodiment, at least one of the handle 12, basket 14, and base 16 is made from a nylon material while at least one of handle 12, basket 14, and base 16 is made from a HDPE material. In one embodiment, handle 12 comprises a nylon material, basket 14 comprises a HDPE material, and base 16 comprises a nylon material.

In one embodiment, one or more of the handle 12, basket 14, and base 16 are made from a red-colored material and one or more of handle 23, basket 14 and base 16 are made from a non-red colored material, such as grey. In another embodiment, a handle 12 and base 16 are made from a non-red colored material and basket 14 is made from a red-colored material. In another embodiment, each of the handle 12, basket 14, and base 16 are made from a red-colored material. In another embodiment, each of the handle 12, basket 14, and base 16 are made from a non-red colored material.

As shown in FIGS. 1-2, in one embodiment, handle 12 comprises a frame 60 including rear portion 62, side portions 64, 65, front portion 66, front corner portions 68, and rear corner portions 72A, 72B. In one aspect, frame 60 of handle 12 comprises a substantially continuous loop. In another aspect, the substantially continuous loop has a size and shape that substantially match a size and shape of a mouth 73 of basket 14. In one aspect, mouth 73 comprises an upper edge of basket 14, including upper edges 86A,86B, 85 as described in more detail later in association with FIGS. 1-8. In one aspect, the shape of the substantially continuous loop is a generally rectangular shape and the shape of the mouth 73 is a generally rectangular shape.

Each rear corner portion 72A, 72B of frame 60 of handle 12 comprises a connecting portion 74A, 74B, respectively, extending downward for attachment relative to basket 14. Each rear corner portion 72 also comprises a pivot mechanism 76 for pivotal mounting of gate 22 of gate and seat assembly 20 relative to frame 60 of handle 12. Each front corner portion 68 of frame 60 of handle 12 comprises a connecting portion 69A, 69B extending downward for attachment relative to basket 14.

In one embodiment, as shown in FIG. 1, handle 12 of cart 10 comprises a panoramic grasping zone 90 including front grasping zone 90A, side grasping zones 90B, 90C and rear grasping zone 90D. Grasping zone 90 comprises a 360 degree orientation (e.g., a universal orientation) defined via handle 12 to enable a consumer to quickly and easily grab handle 12 no matter where the consumer is located relative to a front, side, or rear of cart 10. In one aspect, front grasping zone 90A of handle 12 is defined by generally elongate slot 93 between front portion 66 of handle frame 60 and upper edge 85 of basket 14. Side grasping zones 90C, 90B of handle 12 are defined, respectively, by generally elongate slots 91A, 91B between side portion 65 of handle frame 60 and upper edge 86A of basket 14 and between side portion 64 of handle frame 60 and upper edge 86B of basket 14, respectively. Rear grasping zone 90D of handle 12 is defined by the generally elongate spacing between rear portion 62 of handle frame 60 and upper edge 87 of gate 22 of gate and seat assembly 20.

In one embodiment, slots 91A, 91B have a length that is substantially equal to a length of panel 110A, 110B, respectively, as extending longitudinally between a front portion 50 and rear portion 51 of cart 10. In one embodiment, slot 93 has a length that is substantially equal to a length of panel 112 extending transversely across a front portion 50 of cart 10

Grasping zone 90 enables a consumer to conveniently grab any portion of cart 10, from the side, the front, or the rear of the cart to pull or push the cart in a desired direction. In this respect, shopping cart 10 provides an ergonomic shopping experience by enabling the consumer a grab-and-go interface with cart 10 in which the consumer can readily grab handle 12 from any position (front, back, side, rear) relative to the cart 10, and go in a desired direction by pushing, pulling or turning the cart as desired. In one example, this panoramic grasping mechanism enhances a consumer's ability to place items in basket 14 by enabling the consumer to stand near a front portion 50 of cart 10 while putting items in basket 14 and pulling cart 10 via front portion 66 of frame 60 of handle 12.

Moreover, in another aspect of handle 12, the combination of the relatively long length of slots 91A,91B,93 associated with the respective portions 65, 64, 66 of handle frame 60 defines a top rail of cart 10. This top rail enables a consumer to slide their hand along handle 12 to position their hand at a desired location of the cart (e.g., front, side, rear) prior to initiating a pushing, pulling, or turning action on the cart.

In one embodiment, handle 12 is a member that is separate from and independent of basket 14 and wheeled base 16, as shown further in FIG. 2. As shown in FIG. 1, handle 12 acts as an independent structural member, unlike handles of conventional carts in which a handle typically forms an extension of a wheeled chassis.

In another embodiment, handle 12 also defines a structural frame 100 in cooperation with basket 14. In particular, when connected to basket 14 at rear corner portions 72A, 72B and front corner portions 68 of frame 60 of handle 12, frame 60 of handle 12 defines an upper portion 101 of structural frame 100 in cooperation with a plurality of frame members of basket 14. In another embodiment, handle 12 is connected to basket 14 at locations other than corner portions 72A, 72B, 68 such as along a side portion 54, 56 or front portion 50.

In one embodiment, as shown in FIGS. 1-3, frame 100 of basket 14 comprises a plurality of interconnected frame members comprising rear upright frame members 102A, 102B, front upright frame members 104A, 104B, bottom side frame members 106A, 106B, and bottom front frame member 108. In one aspect, bottom side frame members 106A and 106B are generally parallel to each other and spaced from each other with bottom front frame member 108 extending between, and being generally perpendicular to, the bottom side frame members 106A,106B. In another aspect, bottom side frame members 106A, 106B are oriented at a slight angle relative to one another toward convergence in the direction of front portion 50 of cart 10.

Rear upright frame members 102A and 102B of structural frame 100 of basket 14 are generally parallel to and spaced from each other, and include a bottom end comprising lower connecting portions 92A, 92B and an upper end including upper connecting portions 82A, 82B, respectively. Bottom side frame members 106A, 106B extend generally forward from bottom end of rear upright frame members 102A and 102B to opposite end of bottom front frame member 108.

Front upright frame members 104A and 104B of structural frame 100 of basket 14 are generally parallel to and spaced from each other, and include a bottom end and an upper end including upper connecting portions 84A, 84B Bottom front frame member 108 extends between and is connected to each respective bottom end of front upright frame members 104A and 104B. In one aspect, front upright frame members 104A, 104B are also generally parallel to and spaced from rear upright frame members 102A, 102B, respectively. In another aspect, front upright frame members 104A, 104B at front portion 50 of cart 10 and rear upright frame members 102A, 102B at rear portion 51 of cart 10 extend generally upward at a slight angle relative to each other in a divergent orientation.

Accordingly, structural frame 100 of basket 14 defines a box-like arrangement to provide shape as well as structural strength and stability to basket 14.

In one aspect, handle 12 acts as an upper portion 101 to frame 100 of basket 14 with side portions 64,65 of handle frame 60 extending generally parallel to, and spaced from bottom side frame members 106A, 106B and with front portion 66 of handle frame 60 extending generally parallel to, and spaced from bottom front frame member 108. In this position, handle 12 is connected to basket 14 at corner portions 68 and 74A,74B of handle frame 60. In particular, connecting portions 69A, 69B of each front corner portions 68 of handle 12 are secured relative to upper connecting portions 84A, 84B of front upright frame members 104A, 104B of basket 14, respectively. In addition, connecting portion 74A, 74B of each rear corner portions 72A, 72B of handle frame 60 are secured relative to upper connecting portions 82A, 82B of rear upright frame members 102A, 104B of basket 14. In this way, handle 12 is connected to and extends from basket 14 to define upper portion 101 of structural frame 100 for basket 14.

In one embodiment, a mechanism for securing handle 12 relative to basket 14 is later illustrated in association with FIG. 5.

As shown in FIGS. 1-2, structural frame 100 of basket 14 defines a size and shape for basket 100, and enables support of a plurality of panels 110A, 110B, 112 between respective frame members 102A-108 of structural frame 100 of basket 14. In one aspect, panels 110A, 110B, 112 are identified in FIGS. 1-3 by dashed lines forming a generally trapezoidal or generally rectangular shape, although panels 110A, 110B, 112 are not strictly limited to these shapes.

In one embodiment, side panel 110A extends upwardly from and is supported by bottom side frame member 106A while extending longitudinally between rear upright frame member 102A and front upright frame member 104A. Side panel 110B extends upwardly from and is supported by bottom side frame member 106B while extending longitudinally between rear upright frame member 102B and front upright frame member 104B. Side panel 110A and side panel 110B are generally parallel to each other, and spaced from each other. In one aspect, side panel 110A and side panel 110B are oriented in an angled pattern of convergence toward a front portion 50 of cart 10 so that front portion 50 of cart is narrower than rear portion 51 of cart 10. Front panel 112 extends upwardly from and is supported by bottom front frame member 108 while extending transversely across front portion 50 of cart 10 between front upright frame members 104A and 104B. In one aspect, front panel 112 is positioned generally perpendicular to side panels 110A, 110B, as well as generally perpendicular to bottom panel 114. As shown in FIG. 3, bottom panel 114 extends between, and is supported by, bottom side frame member 106A, bottom side frame member 106B, and bottom front frame member 108.

In one aspect, structural frame 100 comprises a unitary member in which rear upright frame members 102A, 102B, front upright front members 104A, 104B, bottom side frame members 106A,106B, and bottom front frame member 108 extend into and blend into each other (i.e., are joined seamlessly together), and therefore do not comprise separate members connected together via fasteners. In one aspect, each panel 110A, 110B, 112 and 114 extends between, and is contiguous with, each respective adjacent frame member 102A-108 to further define this unitary member comprising basket 14. In this arrangement, panels 110A, 110B, 112, and 114 and frame members 102A-108 extend into one another (i.e., are joined seamlessly together), rather than being separate members connected solely via fasteners as in a conventional cart construction.

Accordingly, with side panels 110A and 110B, front panel 112, and bottom panel 114 supported by structural frame 100 (including frame 60 of handle 12), basket 14 defines a robust container suitable for carrying items in basket 14

Moreover, in one embodiment, the strength and stability provided by structural frame 100 of basket 14 (including frame 60 of handle 12 acting as upper portion 101 of frame 100) enable panels 110A, 110B, 112 of basket 14 to have a thin wall construction. In one aspect, because handle 12 acts as upper portion 101 of structural frame 100 of basket 14, upper edges 86A, 86B, 85 of respective side panels 110A, 110B, 112 of basket 14 are sized to terminate in a low-profile thickness. This arrangement avoids bulky plastic or metal reinforcers at mouth 73 of the basket 14, which simplifies basket 14 while contributing a smoother, ergonomic basket 14 having a sleek appearance and gentle tactile feel. In another aspect, the strength of frame 100 of basket 14 enables avoiding the use of additional support members extending transversely (whether diagonal or horizontal or vertical) across a middle portion of panels 110A, 110B, 112.

In another aspect, side portions 65, 64 of handle frame 60 extend in substantially the same generally vertical plane as respective side panels 110A, 110B, and front portion 66 of handle frame 60 extends in substantially the same generally vertical plane as front panel 112. This arrangement positions handle 12 directly over the respective panels of basket 14 to provide direct support to these panels 110A, 110B, 112.

Additional aspects of basket 14 relating to the attributes and features of panels 110A, 110B, 112, and 114, as well as frame members 102A-108, are later described and illustrated in association with FIGS. 5-9.

As shown in FIG. 2, in one embodiment, basket 14 comprises defines a rear opening 117 at which gate 22 of gate and seat assembly 20 is pivotally mounted via pivot mechanism 76 in handle 12, as also shown in FIG. 1. Pivot mechanism 76 enables pivotal movement of gate and seat assembly 20 relative to both basket 14 and handle 12. In this arrangement, pivot mechanism 76 is mounted on handle 12 independent of wheeled base 16 or basket 14. Additional aspects of gate and seat assembly 20 are later described and illustrated in association with FIGS. 10-15B.

As also shown in FIGS. 1-3, in one embodiment, basket 14 and base 16 of cart 10 form a cantilevered arrangement in which basket 14 (with handle 12 mounted thereon) is completely supported by a single axis of vertical support extending upwardly from base 16. This single axis of vertical support is provided by a pair of masts 35A, 35B of cart 10, defined by a portion of base 16 and a portion of basket 14 mated together. In one aspect, the masts 35A,35B extend in a generally singular plane laterally across the rear portion of the cart 10 between side portions 52,54 of cart 10. This arrangement enhances access to tray 28 (FIG. 1) of base 16, eliminates extra, unsightly vertical supports, and maintains a large weight bearing capacity of cart 10. In another aspect, masts 35A,35B are positioned adjacent rear portion 51 of cart 10 to support basket 14 (e.g. a front portion of basket 14) in a vertically spaced relationship over base 16 (e.g., a front portion of base 16) adjacent the front portion 50 of cart 10.

In one aspect, mast 35A comprises lower connecting portion 92A of basket 14 as mated with base support 36A of base 16 and mast 35B comprises lower connecting portion 92B of basket 14 as mated with base support 36B of base 16. Additional aspects of masts 35A,35B of cart 10 and the cantilever support they provide to basket 14 are described after a further description of wheeled base 16, in association with FIG. 2.

As shown in FIG. 2, base 16 is configured to support basket 14 and comprises frame 200 including legs 34A, 34B for supporting wheels 32 (shown in FIGS. 1 and 3). Frame 200 comprises a unitary member including a front portion 210, side portions 212A, 212B, front wheel support member 213 and rear portion 214. Front wheel support 213 extends laterally between opposite side portions 212A and 212B and is positioned to support front wheels 30 (shown in FIGS. 1 and 3). Rear portion 214 of frame 200 of base 16 comprises a support member that extends laterally between opposite side portions 212A, 212B at an end of frame 200 longitudinally spaced from front portion 210 of frame 200. Rear portion 214 provides lateral strength and stability to base supports 36A, 36B, as well as lateral strength and stability to legs 34A, 34B. In one aspect, rear portion 214 extends in substantially the same plane (B) as legs 34A, 34B. In one aspect, rear portion 214 comprises a shelf 215 and ridge 216, which together provide a horizontal support for tray 28.

In one embodiment, base supports 36A, 36B of base frame 200 also comprise a pair of generally vertical trunks 240A, 240B, with each trunk 240A, 240B extending upward from a respective side portion 212A, 212B of frame 200. Each trunk 240A,240B comprises prongs 244A, 244B, respectively, that extend outwardly and upwardly from base portion 242A, 242B. Base supports 36A, 36B and side portions 212A, 212B together form a junction 220A, 220B and also define an apex 222 from which legs 34 extend to rotatably mount support wheels 32.

As further shown in FIG. 2, prongs 244A, 244B of base supports 36A,36B are aligned for insertion into receiving portions 243A, 243B (shown in phantom) of rear upright frame members 102A,102B via lower connecting portions 92A, 92B of basket 14. In one aspect, receiving portions 243A, 243B of basket 14 are sized and shaped (including a length) to enable prongs 244A, 244B to extend within a substantial length or a majority of a length of rear upright frame members 102A, 102B of basket 14 to strengthen the interconnection of basket 14 relative to base 16. Accordingly, in one aspect, prongs 244A, 244B have a length substantially the same as a slot defined by receiving portions 243A, 243B of basket 14.

This arrangement enhances the ability of mast 35A, 35B and base 16 to maintain the cantilevered arrangement of basket 14 in a generally horizontal position over base 16 while providing a large weight bearing capacity for basket 14. In one embodiment, mast 35A, 35B, in cooperation with other structural components of cart 10, enables supporting a weight of up to 600 pounds within basket 14.

As shown in FIG. 1, in one embodiment, each mast 35A, 35B comprises a rear portion 245 and a front portion 246. As shown in FIG. 2, rear portion 245 defines a generally straight, generally continuous portion for each mast 35A,35B. For example, rear portion 245 of mast 35A includes rear straight portion 247A of base support 36A, 36B extending upward to straight portion 248 of lower connecting portion 92A, 92B of basket 14, and along the generally straight, rear upright frame member 102A, 102B of basket 14. Accordingly, rear portion 245 of masts 35A, 35B of cart 10 and rear upright frame members 102A, 102B of basket 14 are aligned in substantially the same plane A (shown in FIG. 1).

As shown in FIG. 1, front portion 246 of mast 35A, 35B faces in a direction generally away from the rear portion 245 and defines a generally 180 degree concave curved member on an opposite side of mast 35A,35B relative to rear portion 245. As shown in FIG. 2, in one aspect, front portion 246 of mast 35A, 35B comprises curved portion 249 of base support 36A, 36B and front curved portion 251 of lower connecting portion 92A, 92B of basket 14. In one aspect, front portion 246 of mast 35A,35B defines a generally smooth curve, substantially minimizing discontinuities along front portion 246 to significantly reduce stress concentrations on mast 35A, 35B. This arrangement enhances the relative strength of mast 35A,35B to provide a cantilevered support by omitting conventional sharp interior junctions and corners along a vertical support for a basket. Accordingly, a rear portion 245 of mast 35A, 35B (defining a generally straight, rearwardly tilting member) and a front portion 246 of mast 35A, 35B (defining a concave curved member facing away from the rear portion) define substantially different shapes from each other to provide different functions that contribute together to strengthen mast 35A, 35B as a cantilever support for basket 14.

As shown in FIGS. 1-2, frame 200 of base 16 also comprises legs 34A, 34B which extend rearwardly and downwardly from apex 222 of frame 200. In one embodiment, legs 34A, 34B form a contiguous extension of frame 200 so that legs 34A, 34B and the other portions of base frame 200 integrally form a single unitary member. In another embodiment, legs 34A, 34B each form a separate member from the remainder of base frame 200 and are connected to base frame 200 via fasteners, adhesive means, etc. In one embodiment, each leg 34A,34B extends away from base frame 200 in a direction generally opposite front portion 50 of cart 10.

In one aspect, each leg 34A,34B comprises a generally straight member that extends in a generally single plane (B) which extends, from apex 222, at a generally obtuse angle (α1) relative to rear portion 245 of mast 35A,35B (or relative to rear upright frame member 102A, 102B). In one aspect, this angle (α1) is about 120 to 140 degrees. In another aspect, this angle (α1) is about 130 degrees. In another aspect, each leg 34A, 34B extends at a generally obtuse angle (α2) relative to a generally horizontal plane (H) that extends generally parallel relative to side portions 212A, 212B of frame 200 of base 16. In one aspect, each leg 34A,34B extends at a generally obtuse angle relative to a plane through which the base 16 extends adjacent the front portion 50 of cart 10 with the plane being a generally horizontal plane or a non-horizontal plane. In one aspect, this angle (α2) is about 120 to 140 degrees. In another aspect, this angle (α2) is about 130 degrees. Accordingly, in this aspect, each leg 34A also forms a generally acute angle (e.g. 40 degrees) relative to substantially vertical plane V shown in FIG. 1.

In another aspect, each rearwardly angled leg 34A, 34B (and supported wheel 32) provides an anchor point providing leverage, in cooperation with rearwardly tilted mast 35A, 35B, to counteract a downward gravitational force of items in basket 14 as represented by arrow F in FIG. 2).

In one embodiment, each wheel 32 (as supported by legs 34A, 34B) comprises a plastic material formed into a unitary member. In one aspect, each wheel 32 comprises a nylon material. In another aspect, each wheel comprises a HDPE material. In another embodiment, wheels 32 comprises a rubber material/or a metal material, or a combination thereof.

In another embodiment, besides rear wheels 32 or front wheels 30, other means of locomotion (e.g., rollers, slides, etc) are mounted on base 16 to enable transit of cart 10.

Figure 4:
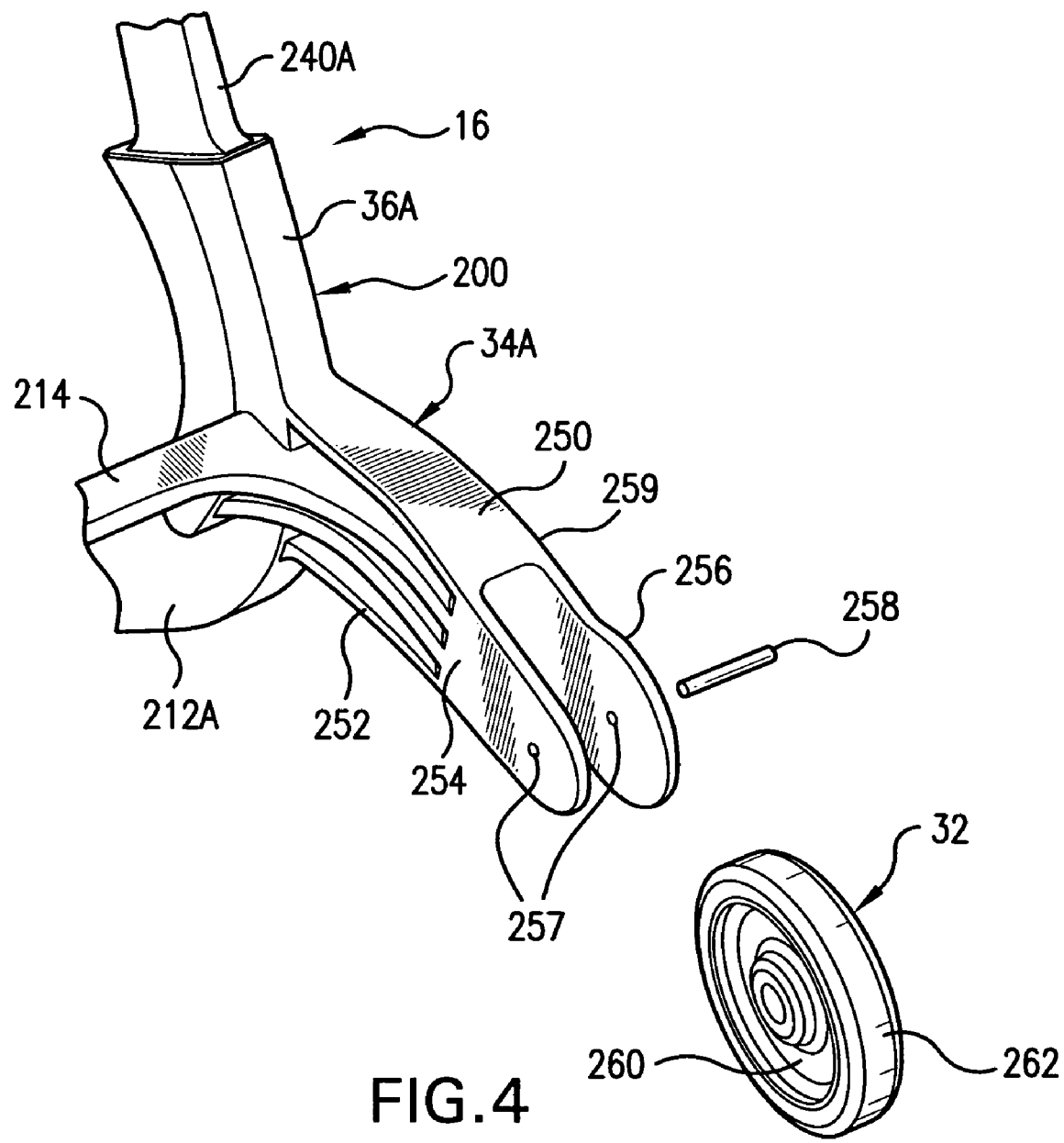
FIG. 4 is an enlarged partial view of a rear leg and wheel assembly, according to an embodiment of the invention.

FIG. 4 is an enlarged perspective view of leg 34A and wheel 32, according to one embodiment of the invention, and which also represents a corresponding structure for leg 34B. As shown in FIG. 4, leg 34A comprises main portion 250 and opposed flanges 254 and 256. Main portion 250 extends from frame 200 (shown in FIGS. 1-2) and also defines a ribbed inner portion 252 configured to provide strength to leg 34A by using less material and while maintaining a generally uniform wall thickness for main portion 250 during molding. Opposed flanges 254 and 256 of legs 34A, 34B are sized, shaped, and positioned to straddle wheel 32 for rotatably mounting of wheel 32 at holes 257 via pin 258, or a similar rotational mechanism or axle mechanism. In one aspect, wheel 32 is generally parallel to and sandwiched between the respective flanges 254 and 256. Outer portion 259 of main portion 250 comprises a generally smooth surface. In one aspect, flange 256 acts as both a protective and decorative shroud for wheel 32, as shown in FIG. 1. In another aspect, flange 256 at least partially covers wheel 32.

In one aspect, as also shown in FIG. 4, wheel 32 comprises a generally disc shaped core 260 made from a plastic material and a tread 262 that slip fits over an outer surface of core 260 with tread 262 being made of a non-slip material (e.g., rubber or other materials) to provide traction for wheels 32.

Figure 5:
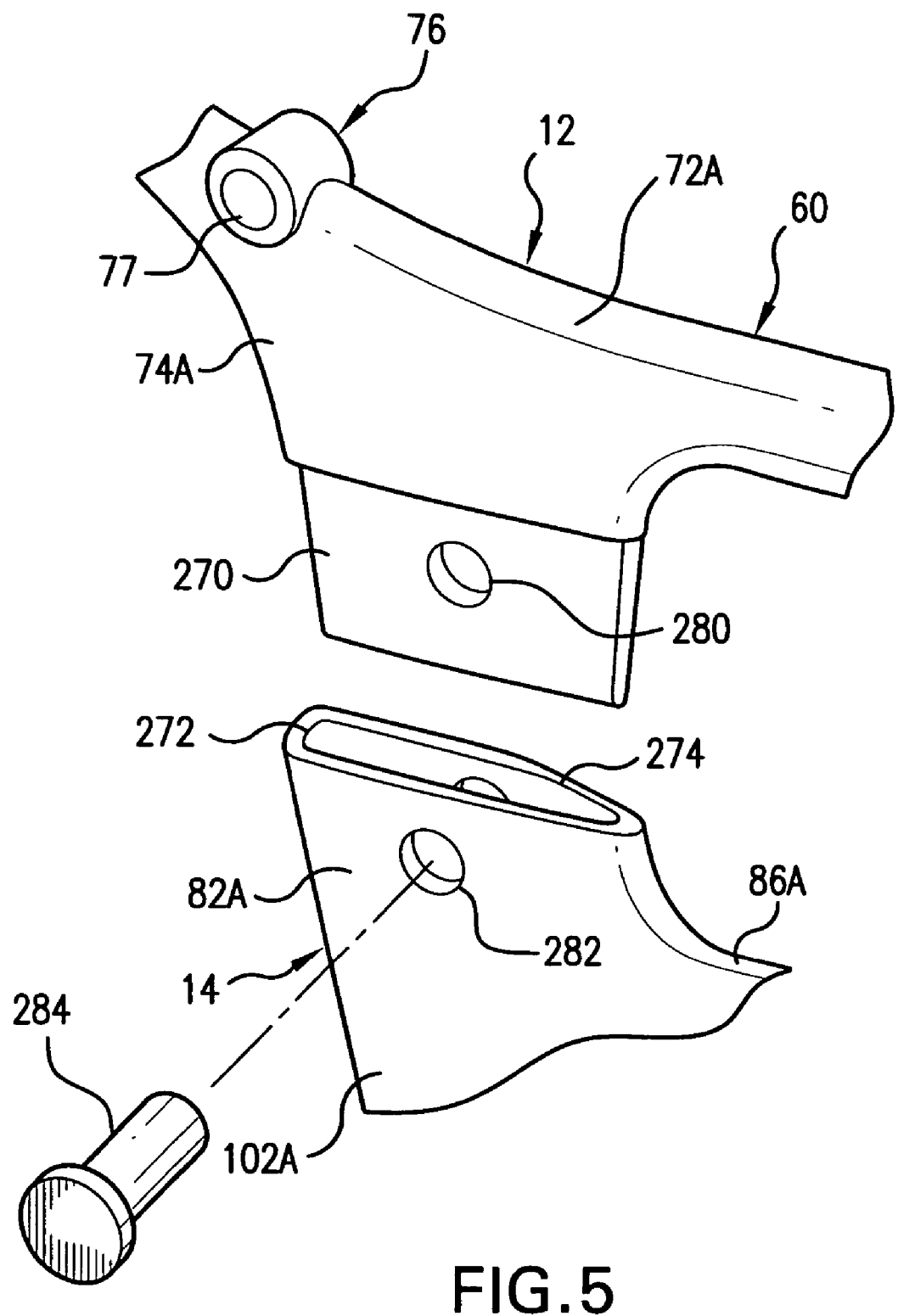
FIG. 5 is an enlarged perspective view illustrating assembly of a handle and a basket of the shopping cart, according to an embodiment of the invention.

FIG. 5 is a partial perspective view illustrating assembly of handle 12 relative to basket 14, according to one embodiment of the invention. As shown in FIG. 5, rear corner portion 72A of handle 12 comprises frame 60 including pivot mechanism 76 with sleeve 77 and including downwardly protruding extension 74A including tongue 270.

In one embodiment, basket 14 comprises upper connecting portion 82A (extending generally upward from rear upright frame member 102A adjacent top edge 86A of basket 14) that defines slot 272 via side wall 274. In one embodiment, tongue 270 is adhesively secured within slot 272 of upper connecting portion 82A to permanently secure handle 12 relative to basket 14. In another embodiment, tongue 270 comprises hole 280 that extends transversely through tongue 270 and connecting portion 82A comprises hole 282 extending through sidewall 274. In one aspect, holes 280 and 282 are sized and positioned on the respective tongue 270 and connecting portion 82A of basket 14 to align with each other when tongue 270 is fully inserted into slot 272 to form a single hole for receiving a securing pin 284 that is slidably insertable into holes 280, 282.

In another embodiment, tongue 270 omits hole 280 and connecting portion 82A of basket 14 omits hole 282 and other forms of connectors, fasteners, adhesives, etc, are used to secure handle 12 relative to basket 14. In one aspect, handle 12 is permanently secured to basket 14 while in other aspects, handle 12 is removably secured relative to basket 14. In this latter aspect, removably securing handle 12 to basket 14 enables replacing a handle 12 on a basket 14 when handle 12 needs repair or is replaced for other reasons, such as changing a handle of one color for another color or changing a handle of one shape for another shape.

In another aspect, other components such as base 16, basket 14, gate and seat assembly 20, tray 28, wheels 30 and 32 are also constructed to be removably securable relative to one another, thereby enabling interchangeability of one component for another. For example, a particular component having one color or shape is exchangeable for a similar component having a different color or different shape, or merely for maintenance purposes.

In one embodiment, a structure as described in association with FIG. 5 (including alternative embodiments and aspects described) is applied for connecting front corner portions 68 of front upright frame members 104A, 104B of basket 14.

Figure 6:
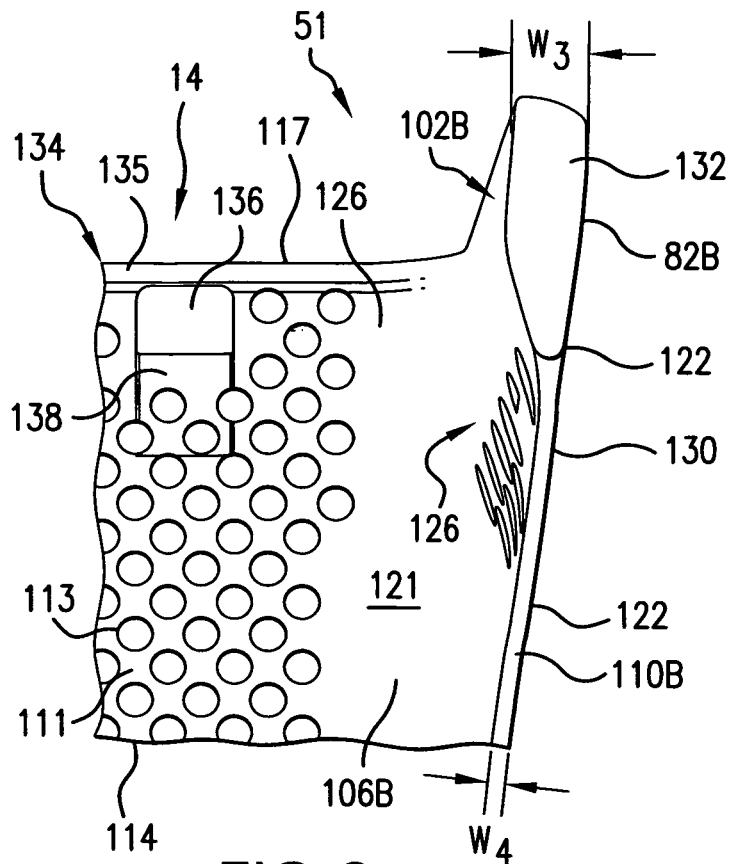
FIG. 6 is an enlarged partial top plan view of a rear portion of a basket of a shopping cart, according to an embodiment of the invention.
Figure 7:
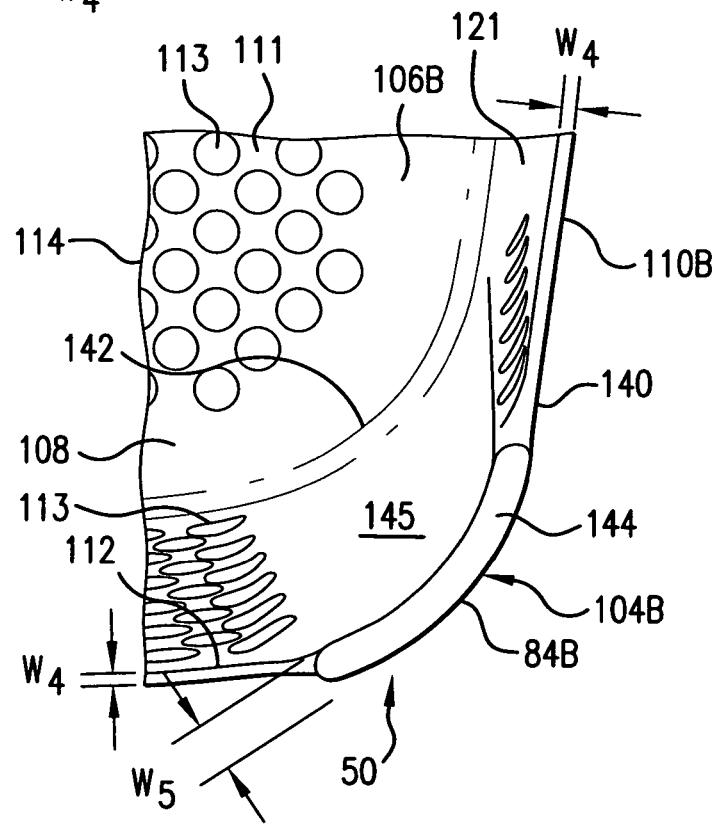
FIG. 7 is an enlarged partial top plan view of a front portion of a basket of a shopping cart, according to an embodiment of the invention.
Figure 8:
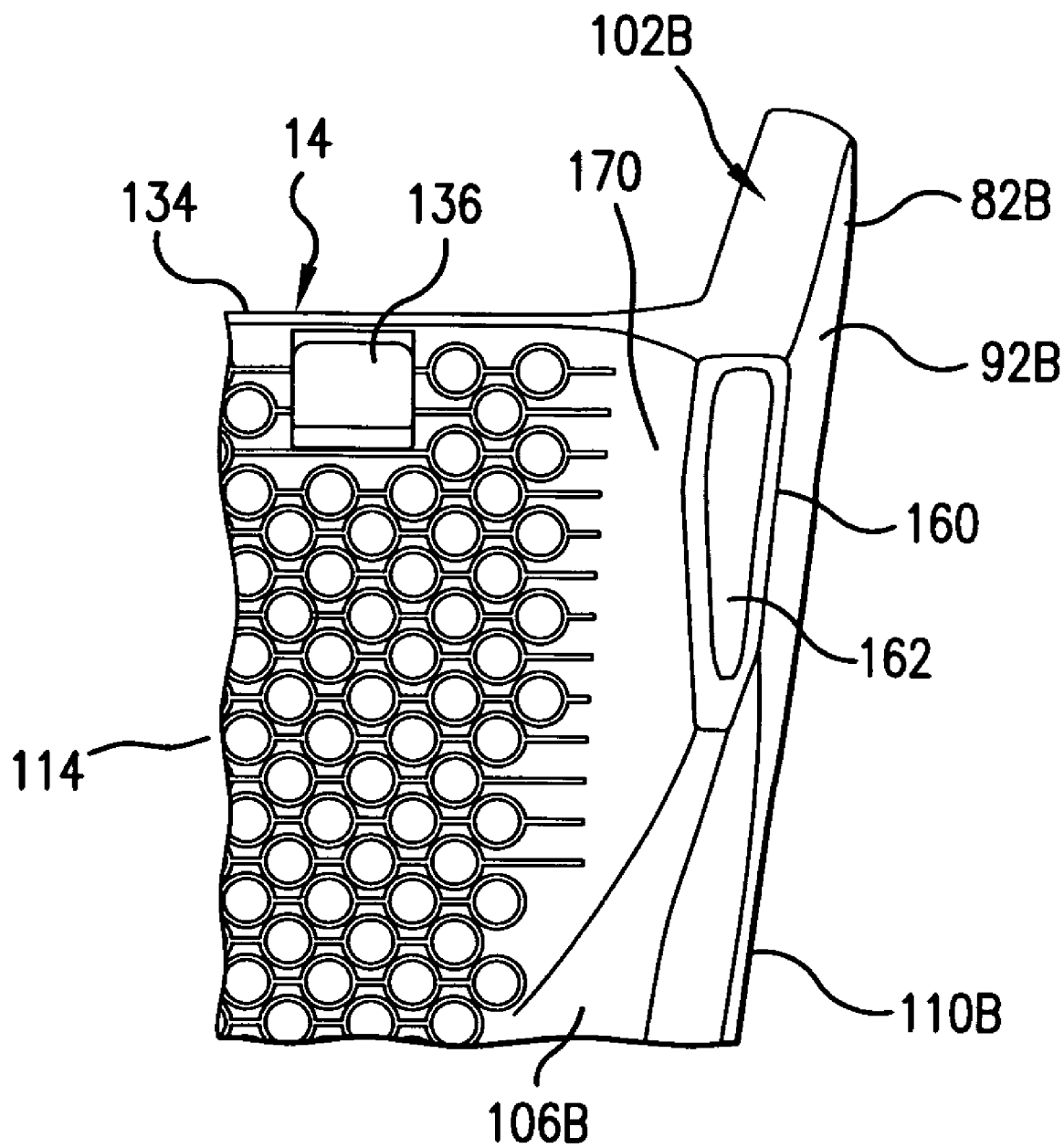
FIG. 8 is an enlarged partial bottom plan view of a rear portion of a basket of a shopping cart, according to an embodiment of the invention.

FIGS. 6, 7, and 8 illustrate various aspects of basket 14, according to embodiments of the invention. FIG. 6 is an enlarged partial perspective view of a rear portion 51 of basket 14, according to one embodiment of the invention, illustrating a rear corner portion of basket 14 including bottom panel 114, side panel 110B, and rear upright frame member 102B along with additional related components. In one aspect, FIG. 6 also represents a corresponding structure on an opposite side portion 54 of basket 14 defined by bottom panel 114, side panel 110A, and rear upright frame member 102A (shown in FIGS. 1-3), except in a mirrored orientation.

As shown in FIG. 6, side panel 110B of basket 14 extends generally vertically upward from bottom panel 114 of basket 14 which extends generally horizontally across to side panel 110A of basket 14 (shown in FIGS. 1-3). In one aspect, basket 14 comprises a rear edge 134 of bottom panel 114 including ridge 135 formed to limit rearward motion of a bottom of gate 22 of gate and seat assembly 20 (shown in FIG. 11). In one aspect, bottom panel 114 also comprises at least one hole 136 including recess 138 for receiving tabs 310 of a gate 22 (described and shown later in FIGS. 10-11) when gate 22 is in a down position with hole 136 limiting further rearward movement of gate 22 relative to opening 117 of basket 14.

As further shown in FIG. 6, basket 14 comprises side panel 110B extending forward from rear upright frame member 102B in a generally vertical plane toward front upright frame member 104B with junction 126 defining a transition between side panel 110B and rear upright frame member 102B. As also shown in FIG. 6, basket 14 comprises bottom side frame member 106B extending forward from rear upright frame member 102B in a generally horizontal plane with bottom side frame member 106B defining a junction between bottom panel 114 and side panel 110B of basket 14. As shown in FIG. 6, side panel 110B has a generally uniform wall thickness and defines a generally continuously smooth inner surface 121 and outer surface 122 of side panel 110B.

In one embodiment, as shown in FIG. 6, rear upright frame member 102B has a width W3 and side panel 110B has a width W4 that is substantially different from and substantially less than width W3. In one aspect, side panel 110B has a width W4 about three times less than a width W3 of rear upright frame member 102B. In other aspect, side panel 110B has a width W4 that is more or less than three times less than width W3.

In one embodiment, as also shown in FIG. 6, upper connecting portion 82B of rear upright frame member 102B of basket 14 comprises a solid member, as shown in FIG. 6, that provides a contact area 132 for fastening relative to connecting portion 74 of handle 12 (FIGS. 1-3). In another embodiment, upper connecting portion 82B of rear upright frame member 102B forms a slot to receive a portion of handle 12, in a manner substantially the same as slot 272 shown in FIG. 5. In another embodiment, the entire rear upright frame member 102B of basket 14, including connecting portion 82B, defines a hollow thin walled structure substantially the same as structure 180 later described and illustrated in association with FIG. 9.

FIG. 7 is an enlarged partial perspective view of a front portion 50 of basket 14, according to one embodiment of the invention, illustrating a front corner portion of basket 14 including bottom panel 114, side panel 110B, and front upright frame member 104B along with additional related components. In one aspect, FIG. 7 also represents a corresponding structure on an opposite side portion 54 of basket 14 defined by bottom panel 114, side panel 110A, and front upright frame member 104A (shown in FIGS. 1-3), except in a mirrored orientation. In one aspect, front panel 112 extends generally vertically upward from frame member 108 of basket 14 and laterally between front upright frame member 104B and front upright frame member 104A of basket 14 (not shown in FIGS. 1-3). In one aspect, front upright frame member 104B comprises a junction between side panel 110B and front panel 112 of basket 14. As further shown in FIG. 7, basket 14 comprises side panel 110B extending rearwardly from front upright frame member 104B with junction 140 defining a transition between side panel 110B and front upright frame member 104B.

In one embodiment, as shown in FIG. 7, front upright frame member 104B has a thickness or a width (W5) and side panel 110B has a width (W4) substantially different from width W5. In one aspect, side panel 110B has a width W4 at least about two times less than a width W5. In other aspect, side panel 110B has a width W4 that is more or less than two times less than width W5.

In one embodiment, upper connecting portion 84B of front upright member 104B of basket 14 comprises a solid member, as shown in FIG. 7, that provides a contact area 144 for fastening relative a portion of handle 12. In another embodiment, connecting portion 84B forms a slot to receive a portion of handle 12, in a manner substantially the same as slot 272 shown in FIG. 5. In another embodiment, the entire front upright frame member 104B of basket 14, including upper connecting portion 84B, defines a hollow thin walled structure substantially the same as structure 180 later described and illustrated in association with FIG. 9.

In one aspect, as shown in FIG. 7, front upright frame member 104B comprises a solid outer wall surface 145 (i.e., without holes) at both an interior surface of basket 14 and exterior surface of basket 14. In this aspect, front upright frame member 104B comprises a substantially different structure from a thin wall structure of side panel 110B and front panel 112 that includes a plurality of holes 113. Front upright frame member 104B defines a member that extends as a curved member between side panel 110B and front panel 112, which are generally perpendicular to each other. This curved member provides a gentle arcuate shape, unlike conventional cart baskets having relatively sharp corners.

As shown in FIGS. 1-7, basket 14 including frame members 102A-108 and panels 110A, 110B, 112, comprises a generally continuously smooth surface, that is generally free of sharp protrusions, edges, ribs, etc, so as to be comfortable for contact with a body of a consumer. In one aspect, as shown throughout FIGS. 1-8, each side panel 110A, 110B, and front panel 112 (also an upper surface of bottom panel 114) comprise a generally contiguous member 111 forming a pattern of holes 113. In one aspect, holes 113 are round, while in other aspects, one or more holes have other shapes, instead of round holes, such as squares, diamond, triangular, elliptical, etc.

In one embodiment, the relative large quantity and relatively large size of holes 113 relative to member 111 minimizes wind loading of basket 14, and therefore cart 10. Accordingly, cart 10 is resistant to unwanted movement caused by the wind in an outdoor environment.

FIG. 8 is an enlarged partial bottom plan view of basket 14, according to one embodiment of the invention, illustrating a rear bottom corner of basket 14 including bottom panel 114, side panel 110B, and rear upright frame member 102B along with additional related components. In one aspect, FIG. 8 also represents a corresponding structure on an opposite side portion 54 of basket 14 defined by bottom panel 114, side panel 110A, and rear upright frame member 102A (shown in FIGS. 1-3), except in a mirrored orientation.

In one aspect, as shown in FIG. 8, lower connecting portion 92B of basket 14 extends outwardly and downwardly from bottom panel 114 of basket 14 and from rear upright frame member 106B of basket 14 (previously shown and described in association with FIGS. 1-3). Lower connecting portion 92B is sized, shaped, and positioned relative to basket 14 for mating with base support 36B of base 16 (FIGS. 1-3) for connecting basket 14 to base 16. By forming an extension of basket 14, lower connecting portion 92B forms a portion of mast 35B, thereby adding strength and stability to the cantilevered arrangement of basket 14 relative to base 16 as previously described. In one aspect, a curved portion 170 defines a smooth transition and additional support between lower connecting portion 92B, bottom side frame member 106B, and bottom panel 114.

As shown in FIG. 8, in one embodiment, rear upright frame member 102B comprises lower connecting portion 92B (FIG. 1) that comprises slot 160 defined by side wall 162 for receiving prong 244B of base frame 200 (FIG. 2) to secure basket 14 and base 16 together. In another embodiment, the entire rear upright frame member 102B of basket 14, including connecting portion 92B, defines a hollow thin walled structure substantially the same as structure 180 later described and illustrated in association with FIG. 9. In this embodiment, this hollow structure corresponds to receiving portion 245B of rear upright frame member 102B as previously described (shown in FIG. 2). In addition, in this latter embodiment, the hollow structure of rear upright frame member 102B also defines slot 160.

In one embodiment, lower connecting portion 92B is secured to prong 244B of base 16 (FIG. 2) via a pin/hole combination, substantially the same as the structure shown in FIG. 5 for connecting portion 82B of basket 14. In other embodiments, other fasteners, adhesives, and/or melding techniques are applied to secure prong 244B of base frame 200 within slot 160 of lower connecting portion 92B.

As illustrated throughout FIGS. 1-8, in one aspect, basket 14 comprises a generally continuously smooth surface that is achieved, in part, by a thin wall construction of panels 110A, 110B, and front panel 112 in which a sheet member 111 defining panels 110A, 110B, 112 extends in a generally singular plane. In one aspect, sheet member 111 and inner edge 115 of holes 113 formed in member 111 extend in substantially the same plane. This arrangement, in combination with each panel 110A, 110B, 112 having a minimal wall thickness, forms a generally rib-less structure for panels 110A, 110B, 112. Accordingly, each member 111 including holes 113 helps to avoid inadvertently catching items (e.g., hangers, clothing, etc.) against the surface of panels 110A, 110B and 112 or within holes 113 of basket 14.

In another embodiment, this thin wall structure of panels 110A, 110B, 112 (as well as the vertically extending, generally smooth surfaces of frame members 102A-108) also enhances watershed properties of shopping cart 10 by maximizing a surface area of basket 14 that extends in a generally vertical plane and minimizing a surface area of generally horizontal surfaces of side panels 110A, 110B, 112 of basket 14. Accordingly, side wall panels 110A, 110B and front panel 112 are shaped and oriented to shed water. This arrangement facilitates water draining off basket 14 via gravitational force, thereby enabling basket 14 to dry quickly. Moreover, in another aspect, the generally smooth surface of panels 110A, 110B, 112, and frame members 102A-108, along with their generally vertical orientation and thin wall structure, facilitate quick drying of cart 10 with a towel or blower, if desired.

Figure 9:
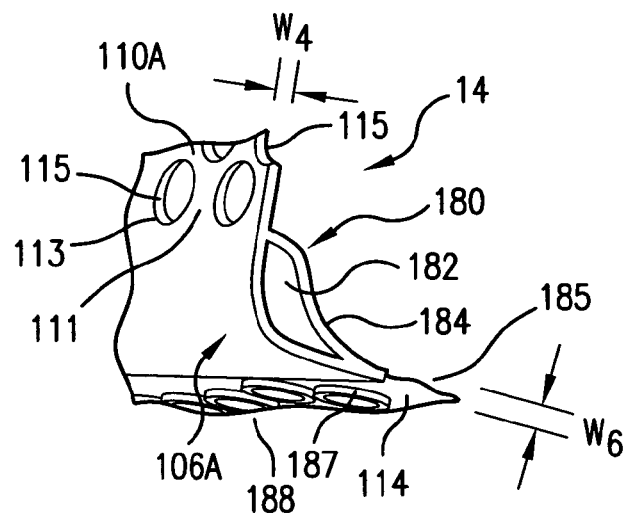
FIG. 9 is a partial sectional view of the basket as taken along line 9-9 of FIG. 2, according to an embodiment of the invention.

FIG. 9 is a partial sectional view of a bottom side frame member 106A of basket 14, according to one embodiment of the invention. In one aspect, FIG. 9 also represents a corresponding structure for one or more other components of cart 10, including all or a portion of frame 200 of base 16, one or more frame members 102A-108 of basket 14, or all or a portion of frame 60 of handle 12.

As shown in FIG. 9, bottom side frame member 106A of basket 14 forms a junction between side panel 110A and bottom panel 114 of basket 14. In one embodiment, bottom side frame member 106A comprises a hollow, thin wall structure 180 including side wall 184 defining hollow channel 182. In one aspect, channel 182 is not limited to the particular shape shown in FIG. 9, but can comprise a generally circular cross-sectional shape, a generally triangular cross-sectional shape, or other shapes. In one embodiment, channel 182 comprises an empty cavity while in another embodiment, channel 182 is filled with a gas. In another embodiment, channel 182 is filled with a solid material different than the material forming side wall 184. In another embodiment, side wall 184 comprises a first plastic material including an additional material, such as a glass-type material (e.g., fiberglass strands), impregnated throughout the first plastic material to increase the strength and/or decrease the weight of side wall 184.

In another embodiment, bottom side frame member 106A is a solid member made of a single material so that no channel 182 is defined in member 106A. In another embodiment, bottom side frame member 106A comprises an additional internal structural member embedded within member 106A, such as a metal rod or component to increase the strength of bottom side frame member 106A while decreasing its size and/or weight.

As further shown in FIG. 9, bottom panel 114 has a width (W6) greater than a width (W4) of side panel 110A to enable a bottom panel 114 of cart to support the weight of heavy items within cart 10. In one aspect, bottom panel 114 comprises a generally smooth surface 185 on an interior of basket 14 and includes ribbed holes 187 on bottom surface 188 of bottom panel 114. In one aspect, ribbed holes 187 define a circular rib extending downwardly, thereby providing additional strength and stability to bottom panel 114 to increase the weight bearing capacity of bottom panel 114.

In addition to embodiments of basket 14 having a hollow thin wall structure, other embodiments of handle 12 and/or base 16 also comprise a hollow, thin wall construction substantially the same as for basket 14. Accordingly, in one embodiment, frame 60 of handle 12 comprises a hollow, thin walled construction. In one aspect, only a portion of frame of handle 12, such as rear portion 62 of handle frame 60, comprises a hollow, thin walled construction. In another embodiment, one or more frame members 102A-108 of frame 100 of basket 14 comprise a hollow, thin walled construction. In one aspect, only one or two portions of a frame of basket 14, such as side portion 106A of basket frame (FIG. 8), comprises a hollow, thin walled construction while other portions of basket frame 100 comprise a solid member.

Accordingly, in some embodiments, one or more portions of each of handle 12, basket 14, and/or base 16 comprise a hollow, thin wall construction while in other embodiments, none of the handle 12, basket 14, and base 16 comprise a hollow, thin wall construction.

In one embodiment, a hollow thin walled construction substantially the same as shown in FIG. 9, is made via a gas-assist mechanism applied to a molten plastic mixture to displace the plastic at an interior of a mold to form the hollow thin wall construction. In one embodiment, handle 12, basket 14, and/or base 16 are made from a gas-assist injection molding process, such as a plastic expulsion molding process available from Cinpres Gas Injection Limited of United Kingdom. In another embodiment, other injection molding systems and methods are employed for constructing the hollow, thin wall structure or for constructing non-hollow portions of base 16, basket 14, and/or handle 12.

Figure 10:
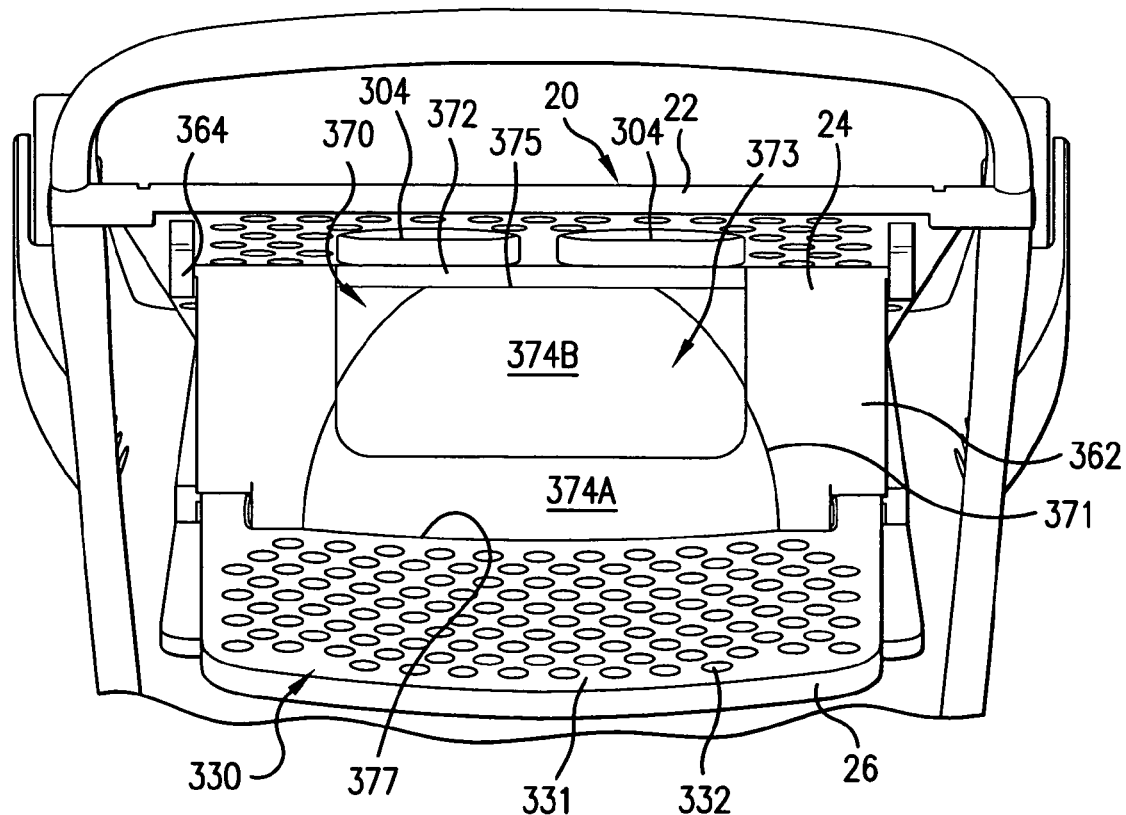
FIG. 10 is a top plan view of a gate and seat assembly of a shopping cart, according to an embodiment of the invention.

FIGS. 10-13B illustrate a gate and seat assembly, according to one embodiment of the invention. FIG. 10 is a top plan view of gate and seat assembly 20, according to one embodiment of the invention. As shown in FIG. 10, gate and seat assembly 20 comprises gate 22, seat 24, and back rest 26. Seat 24 is sized and shaped to support a child or small items. In one embodiment, the entire gate and seat assembly 20, or only portions thereof (e.g. seat 24), is made of a plastic material such as a nylon material, a HDPE material, or other thermoplastic material.

In one aspect, back rest 26 comprises a curved surface to better complement the shape of a child's back while sitting on seat 24. In another aspect, back rest 26 comprises a member defining a generally continuous smooth contact surface 330 including member 331 extending between and defining holes 332. This curved surface and/or smooth contact surface further contributes to the ergonomic environment produced by the various consumer-friendly features of cart 10.

In one embodiment, seat 24 comprises base member 362 and flap 370. A rear edge of base member 362 is pivotally mounted to gate 22 at pivot mechanism 364 and flap 370 is pivotally mounted to base member 362 via pivot mechanism 372. In one aspect, a generally bowl shaped depression 373 is formed via recess 371 in base member 362 and flap 370, and comprises base depression portion 374A and flap depression portion 374B. Interaction of flap 370 and base member 362 of seat 24 are further described and illustrated later in association with FIGS. 13A-13B.

Figure 11:
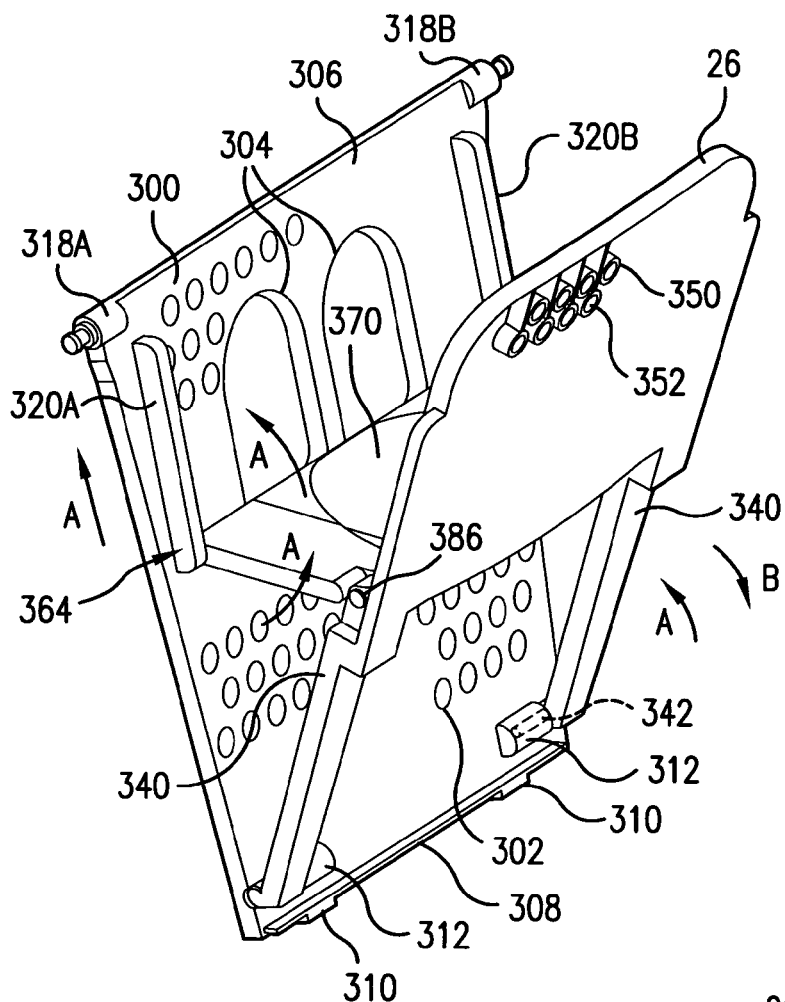
FIG. 11 is a perspective view of a gate and seat assembly of a shopping cart, according to an embodiment of the invention.

As shown in FIG. 11, gate 22 defines opening 304 for legs of a child when sitting on seat 24. Flap 370 is pivotally movable upward (into a generally vertical position) to block openings 304 or pivoted downward (into a generally horizontal position) to form a portion of seat 24, as described in association with FIGS. 10 and 13A-13B. In one aspect, depression 373 provides a more comfortable resting place for a bottom of a child. In one aspect, as shown in FIG. 10, an apex 375 of depression 373 is adjacent leg openings 304 (at a rear edge of base member 362) while a mouth 377 of depression 373 is adjacent to back rest 26 (at a front edge of base member 362). In one aspect, apex 375 comprises an at least partially straight portion defining a generally flat edge. In another aspect, mouth 377 comprises a substantially straight portion defining a generally flat edge.

As also shown in FIG. 11 via directional arrows A and B, seat 24 and back rest 26 are pivotally movable relative to each other, with seat 24 being pivotally movable relative to gate 22, and back rest 26 being pivotally movable relative to gate 22. In use, upon rearward pressure placed on backrest 26 toward gate 22, seat 24 begins to slide upward and pivot relative to tracks 320A of pivot mechanism 364 in gate 22, and legs 340 of backrest 26 begin to pivot at pivot mechanism 312 of gate 22 enabling upper portion of backrest 26 to move toward gate 22. At this same time, seat 24 also pivots at pivot mechanism 386 relative to back rest 26, enabling back rest 26 to collapse against both seat 24 and gate 22. In addition, as previously described in association with FIGS. 1 and 3, gate 22 is pivotally movable via pivot mechanism 76 on handle 12 relative to opening 117 at rear portion of basket 14 (FIG. 3) between a forward, nesting position (not shown) and a rearward position shown in FIGS. 1 and 10.

Gate 22 also comprises a bottom edge 308, which includes tabs 310. Tabs 310 mate with recessed holes 136 in bottom panel 114 of basket 14 (as previously described in association with FIG. 6) when gate 22 is in the closed position shown in FIG. 1 or 10.

As also shown in FIG. 11, in one embodiment, a rear surface of backrest 26 comprises holes 352 defined by ribbed walls 350 for providing strength and stability to backrest 26, with holes 352 generally corresponding to holes 332 on a front surface of backrest 26.

Figure 12:
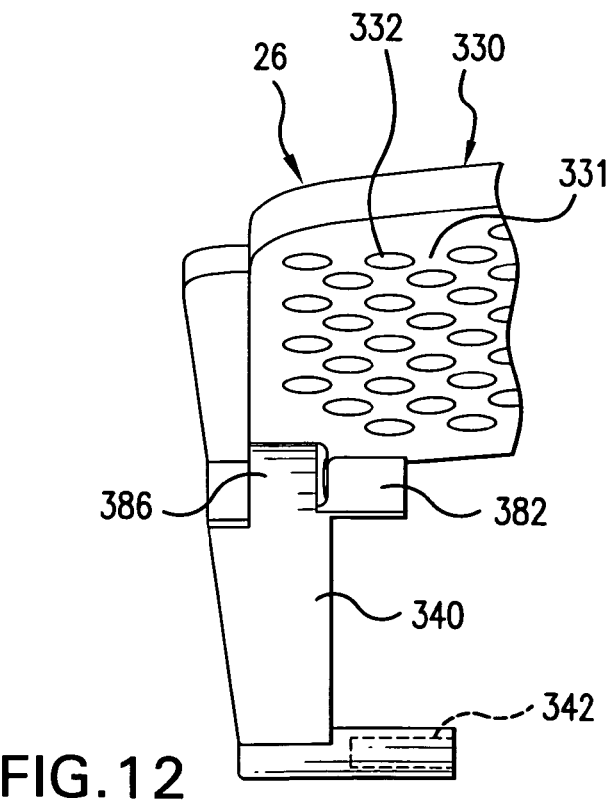
FIG. 12 is a partial perspective view of a back rest of a gate and seat assembly of a shopping cart, according to an embodiment of the invention.

As shown in FIG. 12, back rest 26 comprises corner supports 382 and pivot mechanism 386 (also shown in FIG. 11) for supporting a corner 388 of base member 362 of seat 24 (shown in FIG. 13A) when gate and seat assembly 20 are in the open, in-use position, as shown in FIG. 10.

Figure 13A:
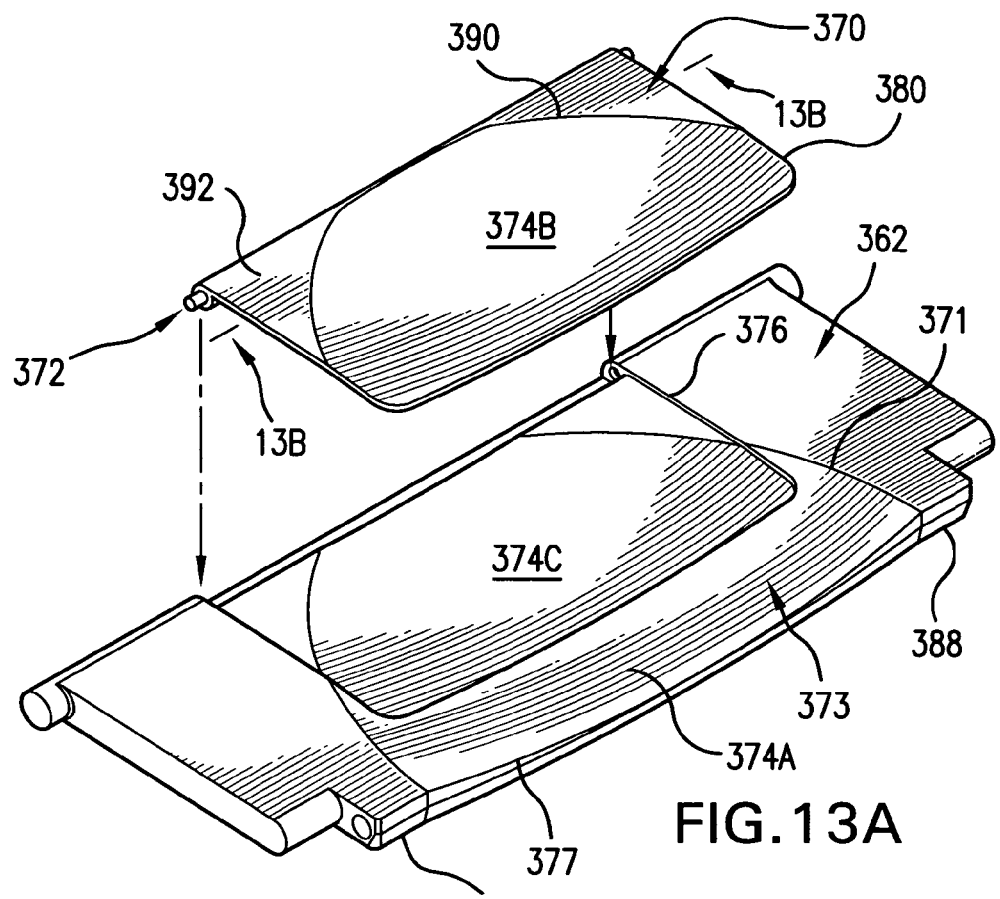
FIG. 13A is a perspective view of a flap and a seat of a gate and seat assembly of a shopping cart, according to an embodiment of the invention.
Figure 13B:
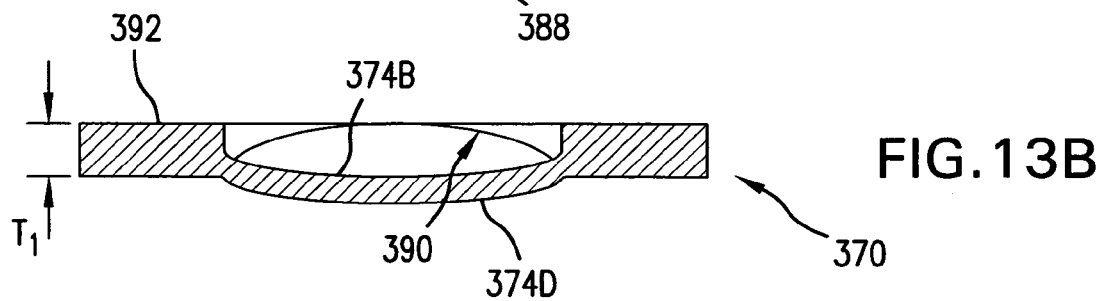
FIG. 13B is sectional view as taken along lines 13B-13B of FIG. 13A of a flap of a gate and seat assembly, according to an embodiment of the invention.

FIG. 13A is a perspective view of flap 370 and base member 362 of seat 24, according to one embodiment of the invention. FIG. 13B is a sectional view of FIG. 13A further illustrating flap 370.

As shown in FIG. 13A, flap 370 and base member 362 together comprise an assembly enabling flap 370 to be pivotally movable upward (to generally cover leg openings 304) and pivotally movable downward to be removably received within recess 376 of base member 362, which is sized and shaped to receive flap 370. In one aspect, recess 376 of base member 362 has a generally rectangular shape substantially matching a generally rectangular shape of flap 370.

In another aspect, when placed in a down position, a top surface of flap depression portion 374B of flap 370 mates in a generally flush relationship with a top surface of base depression portion 374A of recess 371.

As shown in FIG. 13A, if flap 370 were placed in a raised position by pivoting flap 370 relative to base member 362 via pivot mechanism 372, base depression portion 374C of recess 371 would be revealed. Base depression portion 374C comprises a generally concave curved surface for receiving a generally convex shaped bottom surface 374D of flap 370 (shown in FIG. 13B). Base depression portion 374C is superimposed over and intersects with generally rectangular shaped recess 376, sized and shaped to receive flap 370.

As shown in FIG. 13B, bottom surface 374D of flap 370 is sized and shaped to reciprocally mate with base depression portion 374C of base member 362, thereby enabling base depression portions 374B and 374A to mate with each other (at recess 376 and 371) in a generally flush manner as shown in FIG. 10 to comprise a substantially continuous curved concave surface defining depression 373.

Figure 14:
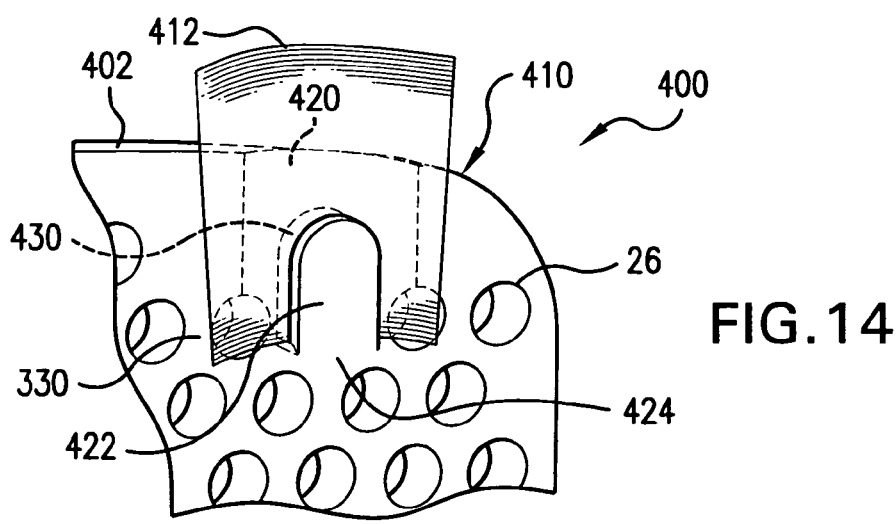
FIG. 14 is a partial perspective view of a note holder of a shopping cart, according to another embodiment of the invention.

FIG. 14 is an enlarged partial perspective view of a backrest 400 of a shopping cart, according to one embodiment of the invention. As shown in FIG. 14, backrest 400 comprises a backrest of a child seat assembly of a shopping cart, such as gate and seat assembly 20 previously described and shown in association with FIGS. 1-12. Backrest 400 comprises noteholder 410 formed in a front surface (or a back surface) at upper portion 402 of backrest 400. In one embodiment, noteholder 410 is sized, shaped, and positioned to releasably hold a notecard 412 (or piece of paper, shopping list, or other article) relative to backrest 400 for the convenience of the consumer. In one aspect, noteholder 410 is disposed on upper portion 402 of backrest 400 to enable a consumer to view a shopping list in a convenient location without having to carry the shopping list in their hands.

In one embodiment, noteholder 410 comprises a recess 420 formed in backrest 400 and a finger 422 protrudes upwardly adjacent to, and spaced from, recess 420 to provide adequate space to slip a shopping list or other paper between recess 420 and finger 422. The curve of recess 420 and the relatively close proximity of finger 422 enable a piece of paper to be held in place by inducing a curve in the paper to effectively press the paper against recess. In one aspect, finger 422 comprises a singular protrusion while in other aspects, finger 422 comprises more than one protrusion in close proximity to recess 420. Moreover, in other aspects, the relative placement of finger 422 and recess 420 are reversed (relative to a front-to-rear orientation of the cart). In one aspect, recess 420 comprises hole 430 to facilitate molding of finger 422 relative to recess 420.

Figure 15A:
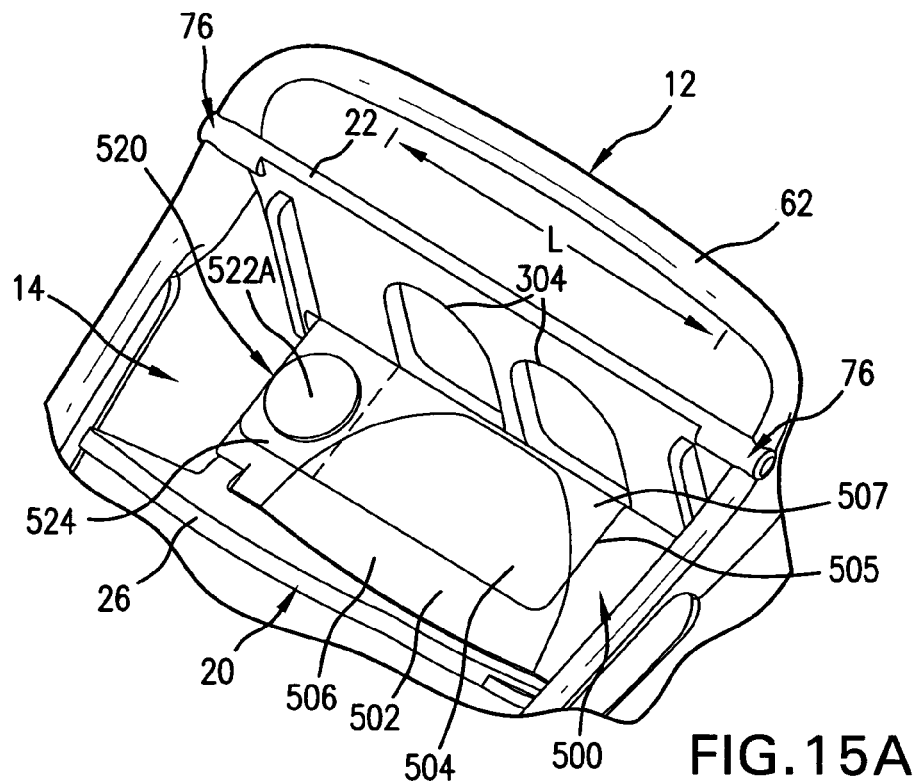
FIGS. 15A and 15B are perspective views of a cupholder seat assembly, according to another embodiment of the invention, illustrating its use in a down position and an up position, respectively.
Figure 15B:
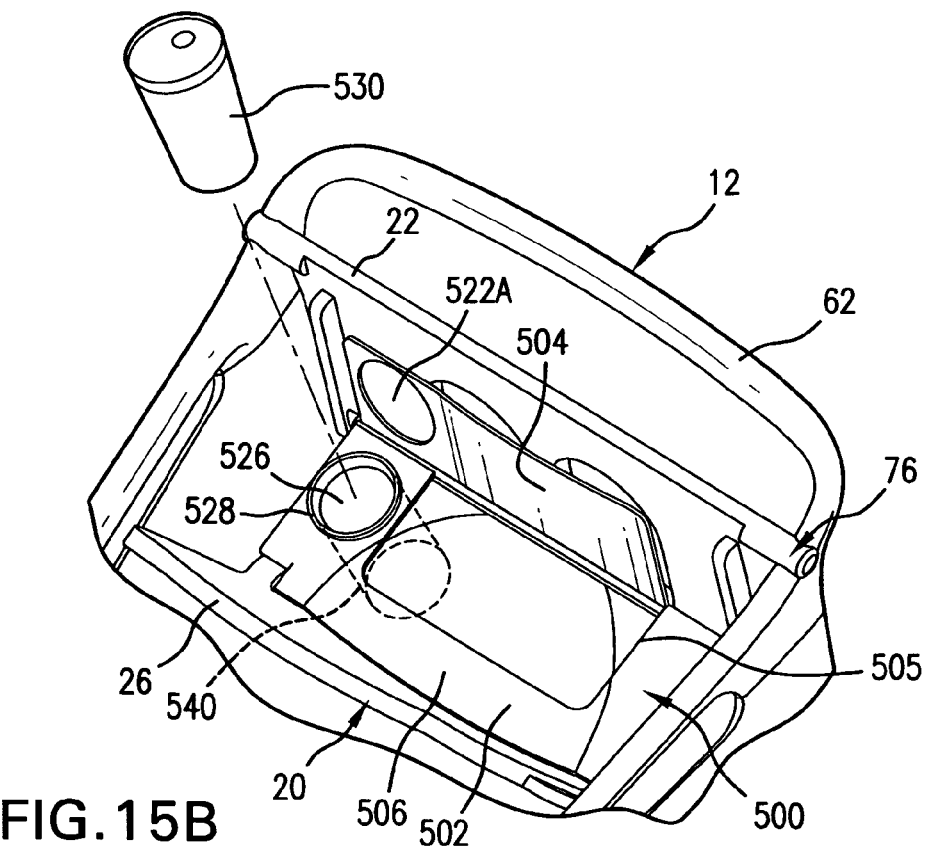

FIGS. 15A-15B are perspective views of a cupholder and seat assembly 500, according to one embodiment of the invention. As shown in FIG. 15, assembly 500 comprises base member 502 and flap 504, which together define a generally bowl-shaped depression 506, and cupholder 520. In one embodiment, assembly 500 including both base member 502 and flap 504 are made of a plastic material such as nylon or HDPE material. In one embodiment, base member 502 comprises recess 505 and pivot mechanism 507 (like pivot mechanism 372 in FIG. 10) pivotally mounting of flap 504 relative to base member 502.

In one aspect, as shown in FIG. 15B, cupholder 520 comprises a hole 526 sized and shaped for receiving and removably holding in place a beverage cup 530. In one aspect, cupholder 520 comprises a ring 528 which acts as a rim that is sized and shaped to substantially match the size and shape of hole 526, and configured to releasably capture or hold beverage cup 530 securely in a generally vertically supported position relative to base member 502 based on the relative diameters of cup 530 and hole 526.

In one aspect, ring 528 defines an inner surface for holding beverage cup with the inner surface extending generally vertically relative to base member 502. In one aspect, ring 528 of cupholder 520 is made of a plastic material such as a nylon material or a HDPE material. In another aspect, ring 528 comprises a material, such as rubber, to frictionally engage the sides of beverage cup 530.

As shown in FIGS. 15A-15B, flap 504 is pivotally movable between a down position shown in FIG. 15A that blocks access to hole 526 of cupholder 520 and an up position shown in FIG. 15B that enables access to hole 526 of cupholder 520 while also at least partially blocking leg openings 304.

In one embodiment, as shown in FIG. 15B, flap 504 comprises a cup cover 522A defining a recess in a bottom surface of flap 504 and which forms a corresponding raised surface on a top surface of flap 504, as shown in FIG. 15A. The cup cover is sized and shaped, having a diameter and a depth, to generally correspond to a mouth of beverage cup 530 and to receive (and encompass) a mouth of beverage cup 530 to the extent to which beverage cup 530 extends above ring 528 of cupholder 520.

In one embodiment, base member 502 and flap 504 comprise substantially the same attributes and features as base member 362 and flap 370 of FIGS. 10-13B, except for base member 502 additionally including hole 526 and ring 528 of cupholder 520 and flap 504 comprising a side portion 524 (identified via a boundary line on flap 504 in FIG. 15A) sized and shaped to cover hole 526 of cupholder 520 when flap 504 is a down position. Accordingly, when flap 504 is in its down position (FIG. 15A), flap 504 mates within recess 505 so that an upper surface of flap 504 is flush with an upper surface of base member 502. In this embodiment, flap 504 has a width represented by L that is substantially wider than a width corresponding to the width of both leg openings 304, with side portion 524 corresponding to the extra width of flap 504 relative to conventional flaps having a width corresponding only to a width of the pair of leg openings 304.

In another aspect, base member 502 comprises a main seat portion (for supporting a child) having a width generally corresponding to a width of flap 504 and a side portion having a width generally corresponding to a width of side portion 524 of flap 504 wherein the side portion of the base member 502 is positioned laterally of leg openings 304.

In another embodiment, side portion 524 is separate from flap 504 and side portion 54 is pivotally movable independent of flap 504 so that placing side portion 524 in the up position provide access to hole 526 but does not block leg openings 304 when flap 504 is in the down position. In this embodiment, side portion 524 has a width that is wide enough to block access to hole 526 of cupholder 512 when independently movable side portion 524 is in the down position (FIG. 15A).

In one embodiment, recess 505 of base member 502 is sized and shaped in a generally rectangular pattern substantially the same as shown in FIG. 13A. In another embodiment, recess 505 of base member 502 is sized and shaped in a generally rectangular pattern that substantially matches the size and shape of flap 504.

In one embodiment, ring 528 is the sole structure of cupholder 520 that securely holds beverage cup 530. In another embodiment, in addition to or in place of ring 528, cupholder 520 comprises a bottom frame member 540 (shown in phantom) for supporting beverage cup 530 and which is made of a plastic material or other material and configured for operation with a collapsible gate and seat assembly.

Embodiments of the invention enable convenient, comfortable, and efficient shopping by a consumer in a store via a panoramic handle, a cantilevered basket, and wheeled base, among other features.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A shopping cart comprising:
   a front portion and a rear portion;
   a base defined by a one-piece member and configured to mount a plurality of wheels;
   a basket defined by a one-piece member molded from a plastic material and supported by the base, wherein the basket includes:
   a front portion and a rear portion;
   a frame including a plurality of generally vertical upright frame members spaced apart from each other, the upright frame members including a pair of front upright frame members and a pair of rear upright frame members;
   a front panel extending generally vertically and laterally across the front portion of the basket between the pair of front upright frame members; and
   a pair of side panels extending generally vertically, being generally parallel to each other and spaced from each other with each side panel extending from the front portion to the rear portion of the basket between one of the respective front upright frame members and one of the respective rear upright frame members; and
   a handle defined by a one-piece member connected to the basket and extending from the front portion of the shopping cart to the rear portion of the shopping cart, wherein the rear portion of the basket is interposed between the handle and the base, further wherein the rear portion of the basket exclusively defines the rear portion of the shopping cart vertically between the handle and the base.

2. The shopping cart of claim 1 wherein the front panel and each of the two side panels comprise a generally flat portion defining a plurality of holes and wherein the holes of the respective side panels and the front panel of the basket define an inner edge, the inner edge of the holes and the generally flat portion extending in substantially the same singular plane to define a structure without ribs.

3. The shopping cart of claim 2 wherein the holes are generally circularly shaped.

4. The shopping cart of claim 1 wherein the basket comprises a pair of opposite sides and the frame of the basket further comprises:
a pair of side bottom frame members extending between the front portion and the rear portion of the basket and laterally spaced from each other to be positioned on the respective opposite sides of the basket, each side bottom frame member vertically supporting a respective one of the side panels; and
a front bottom frame member extending generally perpendicular to and laterally across the front portion of the basket between the respective side bottom frame members, the front bottom frame member vertically supporting the front panel.

5. The shopping cart of claim 4 wherein the basket comprises a bottom panel extending generally horizontally between the respective side bottom frame members and from the front bottom frame member toward the rear portion of the basket.

6. The shopping cart of claim 5 wherein the bottom panel includes a bottom surface comprising ribbed holes and a top surface that is generally smooth without ribs.

7. The shopping cart of claim 4 wherein at least one of the front bottom frame member and the respective side bottom frame members of the frame of the basket comprise a side wall defining a hollow structure.

8. The shopping cart of claim 4 wherein each respective front upright frame member and each respective rear upright frame member comprises a side wall defining a hollow structure.

9. The shopping cart of claim 4 wherein the generally vertical upright frame members of the frame of the basket comprise:
the pair of rear upright frame members extending generally parallel to and spaced from each other, and extending generally vertically upward from and generally perpendicular to each one of the respective side bottom frame members adjacent the rear portion of the basket; and the pair of front upright frame members generally parallel to and spaced from each other, and extending generally vertically upward from and generally perpendicular to the front bottom frame member adjacent the front portion of the basket.

10. The shopping cart of claim 1 wherein the front panel of the of the basket extends laterally across the front portion of the basket between the respective front upright frame members and each respective side panel extends from the front portion to the rear portion of the basket between one of the respective front upright frame members and one of the respective rear upright frame members.

11. The shopping cart of claim 10 wherein the basket defines a pair of connecting portions protruding generally downward adjacent the rear portion of the basket away from the respective side bottom frame members of the frame of the basket, each connecting portion defining a slot configured to removably receive a portion of the base to enable supporting the basket via the base.

12. The shopping cart of claim 1 wherein each respective front upright frame member defines a generally curved shape extending between the front panel and one of respective side panels.

13. The shopping cart of claim 1 wherein each respective rear upright frame member defines a generally smooth surface without holes.

14. A shopping cart comprising:
a base including a plurality of wheels and extending between a front portion and a rear portion of the shopping cart;
a basket supported by the base adjacent the rear portion of the shopping cart and extending generally over, and vertically spaced from, the base adjacent the front portion of the shopping cart, the basket comprising a single component molded from at least one of a nylon material and a high density polyethylene material, the basket including:
means for supporting a plurality of generally vertical panels and supporting one bottom panel in a generally horizontal orientation to contain articles within the basket, with at least one portion of the means for supporting comprising a hollow structure and an outer surface without holes, wherein each of the generally vertical panels includes a plurality of holes and the means for supporting is joined seamlessly relative to the respective generally vertical panels and the bottom panel.

15. The shopping cart of claim 14 wherein each of the generally vertical panels has a thickness of at least one half the thickness of the means for supporting.

16. The shopping cart of claim 14 wherein the holes in each of the generally vertical panels includes an inner edge extending in substantially the same plane as a sheet member defining the holes so that each generally vertical panel has a rib-less structure.

17. The shopping cart of claim 14 wherein the generally vertical panels comprise a front panel extending laterally across the front portion of the cart and a pair of side panels generally parallel to and spaced from each other, with each side panel extending from the front portion of the shopping cart to the rear portion of the shopping cart, wherein the means for supporting comprises a frame including a plurality of generally vertically upright frame members spaced apart from each other.

18. The shopping cart of claim 17 wherein two of the generally vertically upright frame members define front upright frame members positioned adjacent the front portion of the shopping cart with each front upright frame member including a generally curved shape extending between the front panel and one of respective side panels.

19. The shopping cart of claim 18 wherein the at least one portion of the means for supporting comprises the two generally vertical front upright frame members.

20. The shopping cart of claim 19 wherein the generally vertically upright frame members include two rear upright frame members positioned adjacent the rear portion of the shopping cart and laterally spaced apart from each other on opposite sides of the basket, wherein the at least one portion of the means for supporting comprises the two rear upright frame members.

21. The shopping cart of claim 20 wherein the frame comprises a pair of side bottom frame members extending from the front portion of the basket to the rear portion of the basket and vertically supporting the side panels of the basket, and wherein the at least one portion of the means for supporting comprises the respective side bottom frame members.

22. The shopping cart of claim 21 wherein the frame comprises a front bottom frame member adjacent the front portion of the basket, the front bottom frame member extending between the respective side panels and vertically supporting the front panels, and wherein the at least one portion of the means for supporting comprises the front bottom frame member.

23. The shopping cart of claim 14 wherein the hollow structure of the at least one portion of the means for supporting comprises a gas-filled hollowed structure.

24. A shopping cart comprising:
a front portion and a rear portion;
a base defined by a one-piece member molded from a plastic material and configured to mount a plurality of wheels;
a basket defined by a one-piece member molded from a plastic material and supported by the base, wherein the basket includes:
 a front portion and a rear portion;
 a frame including a plurality of generally vertically upright frame members spaced apart from each other;
 a front panel extending generally vertically and laterally across the front portion of the single unitary member between two of the generally vertical upright frame members, the front panel comprising a sheet portion defining a plurality of holes; and
 a pair of side panels extending generally vertically, being generally parallel to each other and spaced from each other with each side panel extending from the front portion to the rear portion of the basket between two of the generally vertical upright frame members, each side panel comprising a sheet portion defining a plurality of holes; and
a handle defined by a one-piece member molded from a plastic material and connected to the basket, the handle extending from the front portion of the shopping cart to the rear portion of the shopping cart,
wherein the rear portion of the basket is interposed between the handle and the base, further wherein the rear portion of the basket exclusively defines the rear portion of the shopping cart vertically between the handle and the base.

25. A shopping cart comprising:
a wheeled base; and
a basket supported by the wheeled base with the basket comprising:
 a single unitary member molded from a plastic material and including a front portion, a rear portion, and a pair of opposite sides, the single unitary member including:
  a frame including a plurality of generally vertical upright frame members spaced apart from each other, the upright frame members including a pair of front upright frame members and a pair of rear upright frame members, wherein at least the pair of front upright frame members include a generally smooth outer surface without holes, wherein the frame further comprises:
   a pair of side bottom frame members extending between the front portion and the rear portion of the single unitary member and laterally spaced from each other to be positioned on the respective opposite sides of the single unitary member; and
   a front bottom frame member extending generally perpendicular to and laterally across the front portion of the single unitary member between the respective side bottom frame members,
    wherein at least one of the front bottom frame member and the respective side bottom frame members comprise a side wall defining a hollow structure;
  a front panel extending generally vertically and laterally across the front portion of the single unitary member between the pair of front upright frame members, wherein the front panel is vertically supported by the front bottom frame member; and
  a pair of side panels extending generally vertically, being generally parallel to each other and spaced from each other with each side panel extending from the front portion to the rear portion of the single unitary member between one of the respective front upright frame members and one of the respective rear upright frame members, wherein each side panel is vertically supported by a respective one of the side bottom frame members,
  wherein the front panel and each side panel comprise a generally flat portion defining a plurality of holes and have a substantially uniform thickness at least about two times less than a thickness of each respective front upright frame member.

26. A shopping cart comprising:
a wheeled base; and
a basket supported by the wheeled base with the basket comprising:
 a single unitary member molded from a plastic material and including a front portion, a rear portion, and a pair of opposite sides, the single unitary member including:
  a frame including a plurality of generally vertical upright frame members spaced apart from each other, the upright frame members including a pair of front upright frame members and a pair of rear upright frame members, wherein at least the pair of front upright frame members include a generally smooth outer surface without holes, wherein the front upright frame members and the rear upright frame members comprise a side wall defining a hollow structure, and wherein the frame further comprises:
   a pair of side bottom frame members extending between the front portion and the rear portion of the single unitary member and laterally spaced from each other to be positioned on the respective opposite sides of the single unitary member; and
   a front bottom frame member extending generally perpendicular to and laterally across the front portion of the single unitary member between the respective side bottom frame members;
  a front panel extending generally vertically and laterally across the front portion of the single unitary member between the pair of front upright frame members, wherein the front panel is vertically supported by the front bottom frame member; and
  a pair of side panels extending generally vertically, being generally parallel to each other and spaced from each other with each side panel extending from the front portion to the rear portion of the single unitary member between one of the respective front upright frame members and one of the respective rear upright frame members, wherein each side panel is vertically supported by a respective one of the side bottom frame members,
  wherein the front panel and each side panel comprise a generally flat portion defining a plurality of holes and have a substantially uniform thickness at least about two times less than a thickness of each respective front upright frame member.

* * * * *